United States Patent
Riekkinen et al.

(10) Patent No.: US 12,465,257 B2
(45) Date of Patent: Nov. 11, 2025

(54) METHOD AND DEVICE FOR REPRODUCIBLE PLACEMENT OF ECG CHEST ELECTRODES

(71) Applicant: BIOPOTENTIAL Oy Ltd, Kuopio (FI)

(72) Inventors: Heikki Riekkinen, Kuopio (FI); Tommi Riekkinen, Kuopio (FI); Annika Kolari, Kuopio (FI)

(73) Assignee: BIOPOTENTIAL Oy Ltd, Kuopio (FI)

( * ) Notice: Subject to any disclaimer, the term of this patent is extended or adjusted under 35 U.S.C. 154(b) by 829 days.

(21) Appl. No.: 17/782,553

(22) PCT Filed: Dec. 4, 2020

(86) PCT No.: PCT/EP2020/084679
§ 371 (c)(1),
(2) Date: Jun. 3, 2022

(87) PCT Pub. No.: WO2021/110937
PCT Pub. Date: Jun. 10, 2021

(65) Prior Publication Data
US 2023/0017159 A1     Jan. 19, 2023

(30) Foreign Application Priority Data
Dec. 5, 2019    (FI) ..................................... 20196062

(51) Int. Cl.
*A61B 5/24*     (2021.01)
*A61B 5/00*     (2006.01)

(52) U.S. Cl.
CPC .................. *A61B 5/24* (2021.01); *A61B 5/68* (2013.01); *A61B 2562/0209* (2013.01)

(58) Field of Classification Search
CPC ..... A61B 5/24; A61B 5/68; A61B 2562/0209; A61B 5/28; A61B 5/282; A61B 5/6823; A61B 5/6841; A61B 5/6842; A61B 5/26
See application file for complete search history.

(56) References Cited

U.S. PATENT DOCUMENTS

| | | | |
|---|---|---|---|
| 4,121,575 A * | 10/1978 | Mills ...................... | A61B 5/282 600/382 |
| 4,593,698 A | 6/1986 | Athans ......................... | 600/386 |

(Continued)

FOREIGN PATENT DOCUMENTS

| | | |
|---|---|---|
| CN | 2698273 Y | 5/2003 |
| CN | 101828915 A | 1/2009 |

(Continued)

OTHER PUBLICATIONS 201742600 (translated) (Year: 2017).*

(Continued)

*Primary Examiner* — Adam Z Minchella
*Assistant Examiner* — Ashleigh Lauren Kern
(74) *Attorney, Agent, or Firm* — Bauer & Joseph

(57) ABSTRACT

The present invention relates to methods for marking positions for or for positioning of six ECG chest electrodes based on a subjects body height, which allows a reproducible placement of the electrodes in serial independent ECG measurements. The present invention further relates to a device for placement of ECG electrodes which implements said method, and methods and uses applying said device. Hence, the present invention provides an accurate and reproducible, easy to use and low-cost method and device for ECG chest electrode positioning, especially in serial examinations and in obese subjects by minimizing the mistakes in ECG chest electrode placement depending on the subjective and inaccurate defining of anatomic remarks for electrode positions.

20 Claims, 8 Drawing Sheets

(56) References Cited

U.S. PATENT DOCUMENTS

| | | | | |
|---|---|---|---|---|
| 6,115,623 | A | 9/2000 | McFee | 600/372 |
| 6,400,975 | B1 * | 6/2002 | McFee | A61B 5/411 |
| | | | | 600/382 |
| 8,731,632 | B1 | 5/2014 | Sereboff et al. | 600/382 |
| 2004/0210149 | A1 | 10/2004 | Wenger | 600/509 |
| 2013/0281814 | A1 | 10/2013 | Til | 600/382 |
| 2016/0331321 | A1 * | 11/2016 | O'Keefe | A61B 5/6805 |
| 2019/0133523 | A1 | 5/2019 | Marcus | |

FOREIGN PATENT DOCUMENTS

| | | | | |
|---|---|---|---|---|
| CN | 106901725 | A | 4/2017 | |
| CN | 106963362 | A * | 7/2017 | A61B 5/6802 |
| TW | 201742600 | A * | 12/2017 | A61B 5/325 |
| WO | WO-2002096287 | A1 | 5/2002 | |
| WO | WO-2008120154 | A2 | 3/2008 | |

OTHER PUBLICATIONS 106963362 (translated) (Year: 2017).*
Rautaharju PM, Park L, Rautaharju FS, Crow R. A standardized procedure for locating and documenting ECG chest electrode positions. J Electrocardiol. 1998; 1: 17-29.

* cited by examiner

METHOD AND DEVICE FOR REPRODUCIBLE PLACEMENT OF ECG CHEST ELECTRODES This application is a national stage application under 35 U.S.C. § 371 of PCT Application No. PCT/EP2020/084679 filed on Dec. 4, 2020, which in turn claimed priority to Finland Patent Application No. 20196062 filed on Dec. 5, 2019.

FIELD OF THE INVENTION

The present invention relates to methods for marking positions for, or for positioning of six ECG chest electrodes based on a subject's body height, which allows a reproducible placement of the electrodes in serial independent ECG measurements. The present invention further relates to a device for placement of ECG electrodes which implements said method, and methods and uses applying said device.

BACKGROUND OF THE INVENTION

Since the introduction of the string galvanometer by Willem Einthoven, the electrocardiogram (ECG) has become the most conducted cardiovascular diagnostic procedure and a fundamental tool of clinical practice (Kliegfield et al 2007). Because of its broad applicability, the accurate recording and precise interpretation of the ECG are critical.

A standard 12-lead ECG consists of 6 limb leads and 6 precordial leads. The six precordial leads are traditionally placed on the chest at the following locations: V1, fourth intercostal space at the right sternal border; V2, fourth intercostal space at the left sternal border; V3, midway between V2 and V4; V4, fifth intercostal space at the midclavicular line; V5, at the horizontal plane of V4 at the anterior axillary line; and V6 in the horizontal plane of V4 at the midaxillary line.

As early as in 1947, Burnett reported about changes in the precordial electrocardiogram, due to the position of the exploring electrode. Kerwin et al wrote 1960: "One of the skeletons in the family closet of electrocardiography is the fact that the selection of exactly the same sites for the placement of chest electrodes in serial tracings is rarely achieved, even when reasonable care is employed". In their own study, they found that in most subjects differences existed in electrocardiogram as a result of moving the electrode 2 cm in one or the other direction. Also, large variation in the actual placement of chest electrodes by several technicians and on repeated attempts by the same technician were shown.

After Zema 1980 poor R wave progression were created with superior and inferior lead position changes, respectively.

Larkin et al concluded in their study 1990: "Significant precordial voltage variation is present in serial electrocardiography, even when performed over the short term. Alteration in precordial electrode placement accounts for the major proportion of variation and this may be sufficiently large to interfere with the accurate interpretation of serial precordial voltage changes in an individual subject".

In the study of Herman et al., 1991, deliberate misplacement of precordial leads by 2 cm resulted significant electrocardiographic interpretation changes in all patients.

In the study of Wenger and Kligfield, 1996, placement of precordial electrodes by 30 experienced technicians during routine electrocardiography was compared with anatomically ascertained sites. Overall 64% of electrodes were placed within a radius of 1.25 inch, ranging from 56% for lead V6 to 74% for lead V4. However, only 27% of electrodes were placed within a radius of 0.625 inch, ranging from 20% for lead V6 to 36% for lead V4.

McCann et al. found in 2007 that even among senior clinicians the estimated lead location differed more than 25 mm in more than one-fifth of patients, which is associated by significant changes in QRS morphology, which might affect clinical interpretation.

Rajaganeshan et al. (2008) found that the correct position of the electrode of the lead V1 in the fourth right intercostal space was identified by 90% of cardiac technicians, 49% of nurses, 31% of physicians and 16% of cardiologists. The electrodes of the leads V5 and V6 were also mispositioned, too high on the lateral chest wall.

In the study of Shoenberger et al (2009) of 33 patients having ECG LVH in the first examination, only 15 retained their diagnosis of LVH on the second ECG during observation in a cardiac observation unit.

Kania et al (2014) found that the shift up to 1 cm from precordial leads in any direction has negligible impact on the ECG morphology. More prominent morphology changes of ECG waves were found for electrode displacements of 2 cm or higher. Differences in ECG signal in V5 and V6 are more connected to ECG amplitude scaling than to morphology changes.

In the methods of the prior art, the locations of ECG chest electrodes are based on human skeletal and soft tissue dimensions. The weakness of this method is, that the dimensions of soft tissues may change in the same individual during a relatively short period, especially because of increased or decreased fat tissue, but also because of increased or decreased musculature. So, the locations of the electrodes are not necessarily the same in the same individual in serial examinations.

In praxis the definition of electrode locations is made by palpation of intercostal spaces, which is inaccurate because of nowadays common obesity. The soft tissue anatomy is defined by visual inspection of imaginary left midclavicular, anteroraxillary and midaxillary lines that are not very accurately defined. For instance, substantial uncertainty exists in estimating visually the location of the midclavicular line. Conventions differ in that the midclavicular line is at times taken as a line parallel to the midsternal line and at times as a line along the chest resembling a meridian along a sphere or a barrel. Visual estimation results in placing V4 electrode in adult men on the average 1.9 cm too far toward the sternum, with a 96% range (SD+/−2) from 1.7 cm to the left to 5.5 cm to the right (14).

At early times of ECG, obesity was not as common as today. Hence, palpation of intercostal spaces was easier and more accurate than nowadays. The same matter affects visual definition of midclavicular and anterior- and midaxillary lines. Regarding the midclavicular line, there is also no clear agreement, if this line is going straight to caudal direction from the clavicular midpoint or more meridional along the thorax. Also the anterior axillary line cannot always be defined on obese people, and the visual definition of midaxillary line is subjective and inaccurate.

On the ground of the above-mentioned a more reproducible method and device for ECG chest electrode positioning are necessarily needed, especially in serial tracings and in obese subjects.

Methods and devices for ECG chest electrode placement have already been described in earlier patent literature. However, most of these disclosures rather focus on designs, which facilitate a placement of electrodes on an individual, instead on accurate and reproducible positioning of the electrodes. There are only a few documents in which an attempt for more reproducible and accurate positioning of ECG chest electrodes have been made.

U.S. Pat. No. 4,121,575 (A) discloses a method and apparatus for rapidly applying electrocardiographic electrodes to a patient's body in clinically acceptable anatomic regions. The authors used a chest piece including a strip of stretchable material with precordial electrodes spaced in clinically acceptable anatomic areas. Unfortunately, the placement of the electrodes for the leads V1-V6 were not very accurate. For instance, the horizontal line of the electrodes for the leads V1 and V2 was, the inter-individually and intra-individually, variable mid-nipple line.

U.S. Pat. No. 4,593,698 B1 discloses an electrocardiograph sensor positioning device and a related method. In this method electrocardiograph sensor positioning device can be retained by a patient after he or she has had an electrocardiograph examination, and which provides a record of the exact location of the electrocardiograph sensors for future reference on subsequent electrocardiohraphic examinations. However, at the first time, the positions of the electrodes for the leads V1-V6 must still be defined by unreliable palpation of intercostal spaces and subjective and inaccurate visual defining of the midclavicular and anterior and midaxillary lines. In addition, the electrodes for the leads V5 and V6 are on the fifth intercostal space, and not at the same horizontal level than the electrode for the lead V4. Moreover, the method and the device are rather complicated, and the device can only be used for a single subject.

U.S. Pat. No. 6,400,975 B1 discloses a patient specific ECG electrode platform and placement system that allows the standard ECG test to be performed by eliminating individual positioning of the six precordial electrodes for all but the first test on a patient. However, at the first time, the positions of the electrodes of precordial leads must be defined by unreliable palpation of intercostal spaces and subjective and inaccurate visual defining of the midclavicular and anterior- and midaxillary lines. Also when using this setting, the device can be used only for this patient.

US 2019133523 A1 discloses a method, wherein the position of ECG precordial leads V1 and V2 are determined by palpation, and the position of precordial leads V4, V5 and V6 are selected using the imaginary midclavicular line and midaxillary line.

WO 02096287 A1 discloses an apparatus for detecting and measuring physiological signals comprising a sensor device having a plurality of electrodes isolated from each other to be non-invasively engaged with a torso of a human being, and signal processing means connected to said plurality of electrodes, characterized in that the sensor device and the signal processing means form an integral unit wherein a first side of the integral unit comprises said plurality of electrodes and a second side opposite the first side comprises the signal processing means. In addition, said document also describes the common way of placing six precordial electrodes, wherein precordial leads V1 and V2 are determined by palpation, and the position of precordial leads V4, V5 and V6 are selected using the imaginary midclavicular line and midaxillary line.

In U.S. Pat. No. 6,115,623 A, a method is described, where the positions of ECG precordial electrodes are first defined by palpation and visually using imaginary anatomical lines. Then an apparatus where the electrodes V1-V6 are mounted on a platform aligned on the torso of the patient. The mount containing each electrode is adjusted until the electrodes are at positions determined according to the commonly used method.

CN 101828915 (A) provides a method, wherein "the upper and lower breastbone edge" (presumably the suprasternal notch and the tip of xiphoid process) and midaxillary line are defined and used as markers of measurements of the electrode positions of the precordial leads. Unfortunately, the length of the xiphoid process is variable (Anderson B W and Burns B, 2019) and its palpation is unreliable. Also, the subjective visual defining of the midaxillary line is inaccurate.

In CN 106901725 (A), the positions of the electrodes are adjusted along the tracks like the Chinese character mi according to the height and the obesity of a human body. As can be taken from FIG. 1, the positions of leads V1 and V2 are on different horizontal levels. Likewise, the positions of leads V4, V5 and V6 are also not on the same horizontal level.

JP H09271466 A discloses a method for transmitting biological information, for instance ECG signals, to a processing unit by wireless transmission to minimize disturbances caused by the electric cables. A method for marking positions for or for positioning of six ECG electrodes is not described.

In a method disclosed in US 2013281814 A1, a subject is provided with a garment, into which a plethora of electrodes is embedded. The selection of the right electrodes is left to a software or to a user based on the respective sensor readings. Consequently, in said method the electrodes are placed by chance, and are selected through the electrode's readings.

CN 2698273 Y discloses a vest type electrode for ECG monitoring using a sweat jacket as the base structure. It is discloses that to some extent the electrodes can be moved and fixed. However, the document is completely silent on the aspect how the locations of the electrodes are selected. The position of the electrodes as shown in FIG. 1 does not at all resemble the positions for six ECG electrodes for precordial leads V1-V6, as commonly used in the art.

Improvement of ECG chest electrode placement has also been the subject of certain non-patent literature.

Rose published 1961 a caliper for setting the precordial leads in electrocardiography. The base is made of stiff brass rod. There are two arms, one (A) fixed to the base, and the other able to slide along it. The arms are connected near the base by a length of 3-mm rubber tubing with marks corresponding to the midline and to the positions for V1-4. The positions of the electrodes for the leads V5 and V6 are not estimated. The positions for V1 and V2 are 16% of the distance from the midpoint to the nearest arms; V4 lies 64% of the distance from the midpoint to arm B; and V3 is midway between V2 an V4. In use, the caliper is laid astride the subject's chest, with one arm in each axilla. The base lies about 1 inch below the xiphisternal joint, with the midpoint of rubber tubing in the subject's midline. The electrode is then placed on the chest vertically above the approximate mark on the tubing. The positions of these electrodes are probable reproducible in lean subjects, but likely not in obese ones. Also, all these electrodes are at the same horizontal level. This horizontal level (about 1 inch below the xiphisternal joint) must be estimated visually and by palpation, which is unreliable, in particular in obese subjects.

Rautaharju et al. published 1976 a method and device for locating the midclavicular line. With the procedure using a device (HeartSquare) for location the midclavicular line, the position of the electrode of the lead V4 is consistently defined in the reference frame of the torso at 45 degrees angle between the midsternal and the left midaxillary lines. However, the intercostal spaces must be determined by palpation, and the midaxillary line visually, both of which provides unreliable results.

Soliman E Z published 2008 a method for recording the distance from the suprasternal notch to the position of the electrodes for the leads V1 and V2 for serial ECG recordings. However, for the first measurement all intercostal spaces must be determined by palpation, and the midclavicular and anterior- and midaxillary line visually, leading to unreliable results.

Lehman et Katona published 2012 a technique involving placement of the patient's hand up against the base of his/her neck to determine the second intercostal space. In this method, too, the other intercostal spaces must be determined by palpation and midclavicular and anterior- and midaxillary lines visually.

Marcus F. et al. published 2018 a method where the sternum length was measured by palpation from the sternal notch to the tip of xiphoid process. The fourth intercostal space was identified by palpation, and the distance from sternal notch to the fourth intercostal space was calculated as percentage of the sternal length (from sternal notch to the tip of the xiphoid process). The palpation of intercostal spaces and the tip of xiphoid process is subjective and unreliable. Apart thereof, the xiphoid process is varying in length from 2 to 5 cm (Anderson B W et Burns B 2019).

In the conventional method, the anatomical locations must be defined by, in particular in obese subjects, subjective and inaccurate palpation, and visually. Therefore the positions of ECG chest electrodes are always not the same in serial examinations. In the opinion of the present inventor, at least one of the most important factors for the great variability in absolute amplitude measurements of precordial ECG leads is the presently used method for the placement of ECG chest electrodes. For the above reasons, a more reproducible method and device for ECG chest electrode positioning are necessarily needed, especially in serial tracings and/or in obese subjects.

Simonson et al. Am. Heart J. 47 (1954): 122-153, describes the origins of vectorcardiography. In vectorcardiography the differences caused by torso shape and dipole location between different individuals have been attempted to decrease, for instance, using more distant electrodes than in precordial leads. Therefore VCG lead systems are quite different from the conventional six electrode precordial lead system.

The object of the present invention is to provide an accurate and reproducible, easy-to-use, and cheap method and device for ECG chest electrode positioning. Such method and device are particularly advantageous in serial examinations and in obese subjects by minimizing the mistakes in ECG chest electrode placement depending on the subjective and inaccurate defining of anatomic remarks for electrode positions.

BRIEF DESCRIPTION OF THE INVENTION

The object of the invention is achieved by a method and a system characterized by what is stated in the independent claims. Preferred embodiments of the invention are claimed in the dependent claims.

In the method of the present invention, the locations of ECG chest electrodes are based only on human skeletal dimensions, that stay practically the same, at least in adults. The stature declines about 1 cm in a decade after age 40, but its clinical significance is negligible. For instance, a 3 cm decrease in stature means a 0.27 cm decrease (0.09×3 cm) in the sternal length (Fernihough A, McGovern M E. Physical stature decline and the health status of the elderly population in England. Econ Hum Biol 2015; 16: 30-44).

In the method of the present disclosure, the positions of the electrodes are defined by the individual skeletal dimensions of the subject. Merely the suprasternal notch must be palpated, which is easy and accurate also in obese subjects, because it is located immediately under the skin.

Specifically, provided is a method for marking positions for and/or positioning of six ECG electrodes for precordial leads V1-V6 on a human subject or a model of a human subject, preferably a human subject, more preferably an obese human subject, based on the subject's body height, wherein the method comprises the steps of (i) determining the horizontal level of the electrodes for leads V4, V5 and V6 (102, 703), wherein the horizontal level (102, 703) is determined to be between (0.088× body height) [cm] and (0.092×body height) [cm] downwards from the sternal notch (701) along the sternal midline (101, 702);

(ii) marking the position of the electrode for lead V1 (104, 708) from 2.8 cm to 3 cm above the horizontal level (102, 703) along the sternal midline (101, 702), and from 2.9 cm to 3.5 cm to the subject's right from the sternal midline (101, 702);

(iii) marking the position of the electrode for lead V2 (105, 709) from 2.8 cm to 3 cm above the horizontal level (102, 703) along the sternal midline (101, 702), and from 2.9 cm to 3.5 cm to the subject's left of the sternal midline (101, 702);

(iv) marking the position for the electrode for lead V4 (107, 704) at the horizontal level (102, 703) and (body height/16)±1 [cm] to the subject's left from the sternal midline (101, 702) along the surface of the thorax;

(v) marking the position for the electrode for lead V3 (106) from (0.023×body height) [cm] to (0.025×body height) [cm] from the position of the electrode for lead V2 (105, 709) to the direction of the position for the electrode for lead V4 (107, 704) along the connecting line formed by the position of the electrode for lead V2 (105, 709) and the position of the electrode for lead V4 (107, 704);

(vi) marking the position for the electrode for lead V5 (705) at the horizontal level (102, 703) and ((3×body height)/32)±1 [cm] to the subject's left from the sternal midline (101, 702) along the surface of the thorax;

(vii) marking the position for the electrode for lead V6 (706) at the horizontal level (102, 703) and (body height/8)±1 [cm] to the subject's left from the sternal midline (101, 702) along the surface of the thorax; and (viii) optionally positioning the six ECG electrodes for precordial leads V1-V6 at the positions identified in steps (ii) to (vii);

as further defined in the claims. In a preferred embodiment, (a) the horizontal level (102, 703) is determined to be (0.09×body height) [cm] downwards from the sternal notch (701) along the sternal midline (101, 702);

(b) the position of the electrode for lead V1 (104, 708) is 3 cm above the horizontal level (102, 703) along the sternal midline (101, 702);

(c) the position of the electrode for lead V2 (105, 709) is 3 cm above the horizontal level (102, 703) along the sternal midline (101, 702);

(d) the position of the electrode for lead V1 (104, 708) is 3.0 cm to the subject's right from the sternal midline (101, 702);

(e) the position of the electrode for lead V2 (105, 709) is 3.0 cm to the subject's left from the sternal midline (101, 702);

(f) the position for the electrode for lead V4 (107, 704) is at the horizontal level (102, 703) and (body height/16) [cm] to the subject's left from the sternal midline (101, 702) along the surface of the thorax;

(g) the position for the electrode for lead V3 (106) is (0.024×body height) [cm] from the position of the electrode for lead V2 (105, 709) to the direction of the position for the electrode for lead V4 (107, 704);

(h) the position for the electrode for lead V5 (705) is at the horizontal level (102, 703) and ((3×body height)/32) [cm] to the subject's left from the sternal midline (101, 702) along the surface of the thorax; and (i) the position for the electrode for lead V6 (706) is at the horizontal level (102, 703) and (body height/8) [cm] to the subject's left from the sternal midline (101, 702) along the surface of the thorax.

Further provided is a device suitable for use in a method of the present disclosure and as further defined in the claims, wherein the device is in the form of a rectangular sheet of a flexible material, having an upper short side (201) and a lower short side (202), and a first long side (203) and a second long side (204);

wherein each short side (201, 202) has a length of from 2.8 cm to 3.2 cm, and each long side (203, 204) has a length of at least 19 cm, and wherein the midline of the device (205) is marked on the upper short side (201) of the device;

wherein a long side of said device (203, 204) carries a mark indicating the distance between the position for the electrode for lead V1 and the position for the electrode for lead V2 (210), starting from the corner (209) of the upper short side (201) and along the long side of said device (203, 204), preferably the second long side (204), further indicating the middle point (208) in between said corner (209) of the upper short side (201) and said mark indicating the position for the electrode of lead V2 (210); and wherein said device comprises along its longitudinal midline a slot (206) for marking the sternal midline and the position of the horizontal level of the electrodes for leads V4, V5 and V6, wherein said device carries marks indicating the distance, starting from the upper short side (201), between the sternal notch and the position of said horizontal level of the electrodes for leads V4, V5, and V6 for different body heights (207); and wherein said device carries marks indicating the distance, starting from a corner of the upper short side (201) and along a long side (203, 204), preferably along the long side opposing the marks indicating the position for the electrode of lead V2 (210), more preferably the second long side (204), between the position of the electrode for lead V2 and the midpoint between the positions for the electrodes for the leads V2 and V4, thereby determining the position of the electrode for the lead V3 for different body heights (213); and wherein said device carries marks indicating the distance, starting from a corner of the upper short side (201) and along a long side (203, 204), preferably along the long side opposing the marks indicating the position for the electrode of lead V2 (210), more preferably the first long side (203), from the sternal midline to the position of the electrode for the lead V4 on the horizontal level of the electrodes for leads V4, V5 and V6 for different body heights (211); and wherein said device carries marks indicating the distance, starting from a corner of the upper short side (201) and along a long side (203, 204), preferably along the long side opposing the marks indicating the position for the electrode of lead V2 (210), more preferably the first long side (203), from the sternal midline to the position of the electrode for the lead V5 on the horizontal level of the electrodes for leads V4, V5 and V6 for different body heights (212); and wherein said device carries marks indicating the distance, starting from a corner of the upper short side (201) and along a long side (203, 204), preferably along the long side opposing the marks indicating the position for the electrode of lead V2 (210), more preferably the first long side (203), of either (i) the position of the electrode for the lead V4 and the position of the electrode for the lead V6 on the horizontal level of the electrodes for leads V4, V5 and V6 for different body heights (211) or (ii) from the sternal midline to the position of the electrode for the lead V6 on the horizontal level of the electrodes for leads V4, V5 and V6 for different body heights, preferably (i) the position of the electrode for the lead V4 and the position of the electrode for the lead V6 on the horizontal level of the electrodes for leads V4, V5 and V6 for different body heights (211); as further defined in the claims.

In accordance with the method disclosed herein, a particular advantageous embodiment of the invention is a device, wherein (a) the length of each short side (201, 202) is 3.0 cm; and (b) the length of each long side (203, 204) 21.0 cm; and (c) the distance between said upper short side (201) and said marks indicating the horizontal level for the electrodes of the leads V4, V5, and V6 (207) is (0.09×body height) [cm], rounded to the nearest 0.5 cm, and said marks (207) indicate the body height corresponding to the such calculated distance; and (d) the distance between the corner of said upper short side (201) and said mark indicating the position for the electrode for lead V2 (210) on said long side (204) is 6 cm, wherein said long side is the second long side (204), and wherein said corner of said upper short side carries a mark indicating the position of the electrode for the lead V1 (209); and (e) the distance between the corner of said upper short side (201) and said marks indicating the position for the electrode for lead V3 (213) is (0.024×body height) [cm], rounded to the nearest 0.5 cm, wherein said marks (213) are positioned along the first long side (203) and said marks (213) indicate the body height corresponding to the such calculated distance; and (f) the distance between the corner of said upper short side (201) and said mark indicating the position for the electrode for lead V4 (211) is (body height/16) [cm], rounded to the nearest 0.5 cm, wherein said marks are positioned along the first long side (203) and said marks (211) indicate the body height corresponding to the such calculated distance; and (g) the distance between the corner of said upper short side (201) and said mark indicating the position for the electrode for lead V5 (212) is ((3×body height)/32) [cm], rounded to the nearest 0.5 cm, wherein said marks (212) are positioned along the first long side (203) and said marks (212) indicate the body height corresponding to the such calculated distance; and (h) the distance between the corner of said upper short side (201) and said marks indicating the position for the electrode for lead V6 (211) is the distance between position of the electrode for the lead V4 and the position of the electrode for the lead V6 on the horizontal level of the electrodes for leads V4, V5 and V6, and the marks indicating the position for the electrode for lead V6 for different body heights (211) are identical to the marks indicating the position for the electrode for the lead V4 (211);

as further defined in the claims. Consequently, said device can be advantageously used for marking positions for or for positioning of six ECG electrodes for precordial leads V1-V6 on a human subject or a model of a human subject, preferably on a human subject, in particular wherein the human subject is an obese human subject. Therefore, a further aspect of the present invention pertains to a method of marking positions for or for positioning of six ECG electrodes for precordial leads V1-V6 on a human subject or a model of a human subject, comprising the steps of (a) aligning the mark of the midline (205) of the upper short end (201) of a device according to any one of claims 8-12 (302) with the midpoint of the sternal notch (301), such that the longitudinal slot of said device (206) is at the midline of the subject's sternum (303), and marking (305) the midline of the subject's sternum (303) through the longitudinal slot of said device (206), and marking (305) the horizontal level of the electrodes for the leads V4, V5 and V6 (306) in accordance with the marks on the device (207) and the subject's body height;

(b) aligning the upper short side (402, 201) to the sternum's midline (405) marked in step (a) (406, 305), and aligning the long side carrying the marks for the position of the electrodes for the leads V4 (406, 507), V5 (408) and V6 (406, 507) to the horizontal level (403, 503) marked in step (a) (406, 305, 505), and marking the position for the individual positions for the electrodes for the lead V4 (407), V5 (409), and V6 (508) in accordance with the marks on the device (406, 408, 507) and the subject's body height, optionally by realigning the device (400, 500) with its corner, formed by the upper short side (201, 502) and the long side carrying the marks for the position of the electrode for lead V4 (406, 507), to the position for the electrode for lead V4 (407, 506) and with said long side carrying the marks for the position of the electrode for lead V4 (406, 507) to the marked position for the electrode for the lead V5 (409), in case the same marks on said long side of the device are used for determining the position of the electrode for the lead V4 and the lead V6 (211, 406, 507);

(c) aligning the device (600) such that the middle point between the marks for the position of the electrode for lead V1 and V2 (208, 602) is positioned 2.8 cm to 3.0 cm, preferably 2.9 cm to 3.0 cm, more preferably 3.0 cm, above the horizontal level for the electrodes for the leads V4, V5, and V6 (605), and on the sternum midline (604) marked in step (a) (603, 305), and marking the position for the electrodes for the leads V1 (609) and V2 (610) in accordance with the marks on the device (209, 210); and (d) aligning the corner formed by the upper short side (201) and the longer side carrying the marks for the position of the electrode for lead V3 (213) with the marked position for the electrode for the lead V2 (806), and simultaneously aligning the long side carrying the marks for the position of the electrode for lead V3 (213) with the marked position for the electrode for the lead V4 (807), and marking the position of the electrode for the lead V3 (808) in accordance with the marks on the device (213) and the subject's body height; and (e) optionally positioning the six ECG electrodes for precordial leads V1-V6 at the positions identified in steps (b) to (d);

as further defined in the claims.

Due to the methods and the device of the present invention, the positions of the electrodes are more reproducible as compared to the positions identified with the methods and devices of the prior art. Besides the right and accurate anatomic placement of ECG chest electrodes, another achievement as compared to the prior art is an increased repeatability of electrode placement in serial examinations, which is essential for estimation of real changes in ECG amplitudes.

In the present invention, only the sternal notch (also called jugular notch) needs to be palpated for the location of the electrodes. This is easy and accurate, even in obese subjects. Therefore, in the method of the present invention, errors in defining the electrode positions are less common and electrode locations are more reproducible.

BRIEF DESCRIPTION OF THE DRAWINGS

The invention will now be further described in connection with preferred embodiments, with reference to the accompanying drawings, in which:

FIG. 8 exemplifies how the device of the present disclosure (800) is aligned with one of its corners of the short upper end to the marked position of the electrode for lead V2 (806) and the longer side extending from said corner with the marked position for the electrode of lead V4 (807). Using the marks for the position of the electrode for lead V3 for different body heights, the position of the electrode for lead V3 (808) can be marked on the subject's chest (here exemplified for a subject with a body height of 170 cm).

DETAILED DESCRIPTION OF THE INVENTION

Figure 1:
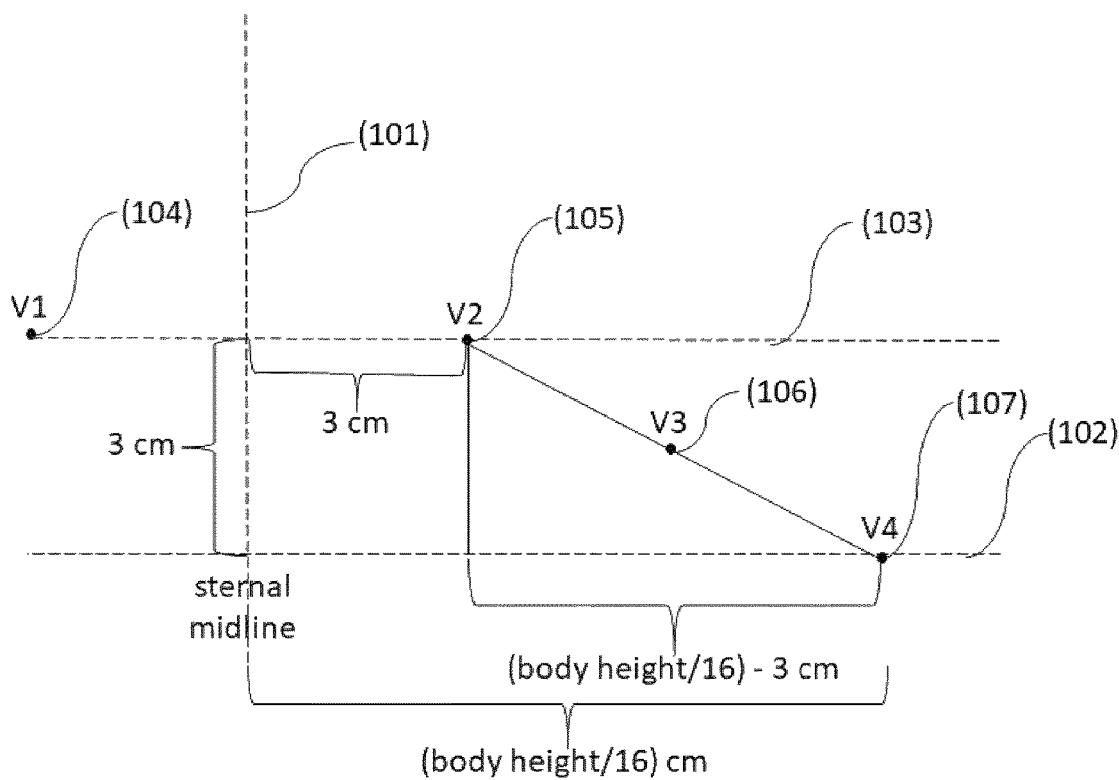
FIG. 1 shows a scheme, illustrating a preferred embodiment of the general method of the present disclosure of marking positions for or positioning of six ECG electrodes for precordial leads on a human subject or a model of a human subject. Specifically, the preferred position of the electrodes for lead V1-V4 is shown. More specifically, the scheme shows the sternal midline (101), and the horizontal level for the position of the electrodes for lead V4, V5, and V6 (102). The position of the electrode for lead 4 (107) is on said horizontal level (102), (body height divided by 16) in cm away from the sternal midline (101). The position of the electrode for lead V1 (104) is preferably 3 cm above the horizontal level for the position of the electrodes for lead V4, V5, and V6 (102), and preferably 3 cm to the subject's right (in the scheme to the left) on the horizontal level for the position of the electrodes for lead V1 and V2 (103). Likewise, the position of the electrode for lead V2 (105) is preferably 3 cm above the horizontal level for the position of the electrodes for lead V4, V5, and V6 (102), and preferably 3 cm to the subject's left (in the scheme to the right) on the horizontal level for the position of the electrodes for lead V1 and V2 (103). The position of the electrode for lead V3 (106) is on the midpoint between the line connecting the position of the electrode for lead V2 (105) and the position of the electrode for lead 4 (107).

In order to provide a method and a device which overcomes the drawbacks set out in the foregoing background section, the present inventors investigated the relationship between the human stature (body height) and sternum length by an extensive review of research data published in various scientific publications. Likewise, the present inventors also conducted an extensive review of independent publications in the scientific literature with the aim to find a relationship between the width of the sternum and the distance between the fourth and fifth intercostal spaces. The findings of this literature review may be summarized as follows:

In a study of Yongue G F et al from Turkey (2014), sternal length was 9.6% of the stature (body height) in men and 9.0% in woman. In a study of Laurin L-P et al from Canada (2012), the percentage sternal length in relation to body height was 9.6% for men and 10.0% for woman. In the study of Macaluso P J, the proportional relationship between sternal length and body height (stature) was 9.6% for men, and 8.8% for woman.

In two Asian studies, the corresponding values were 8.9% for men and 8.2% for woman in the study of Zhang K (2015) in China, whereas in the study of Mendezes R G (2009) in India, said values were 8.5% for men and 9.1% for woman. In the study of Tumram G S (2016) in India, results are only provided for men, wherein the sternal length was 9.1% of the body height.

The mean value for men in Turkey, Canada and Spain was 9.6%; the main value for men in China and two studies in India was 8.8%. In all these studies combined, the mean number was 9.2% for men.

The mean value for women in Turkey, Canada and Spain was 9.3%; whereas the mean value for women in China and India was 8.7%. In all these studies combined, the mean number was 9.0% for woman.

When further combining the results obtained for men and woman, the sternal length was 9.1% of the stature. Preferably, one may advantageously use 9.0% of stature/body height as an estimate for the sternum length in both men and women for practical reasons (Table I.):

TABLE I

Estimation of the sternal length in proportion to the subject's stature/body height in cm. Sternal length is rounded to the nearest 0.5 cm.

| Stature/Body Height in cm | Sternal Length in cm |
| --- | --- |
| 141 | 13 |
| 147 | 13 |
| 148 | 13.5 |
| 152 | 13.5 |
| 153 | 14 |
| 158 | 14 |
| 159 | 14.5 |
| 163 | 14.5 |
| 164 | 15 |
| 169 | 15 |
| 170 | 15.5 |
| 174 | 15.5 |
| 175 | 16 |
| 180 | 16 |
| 181 | 16.5 |
| 186 | 16.5 |
| 187 | 17 |
| 191 | 17 |
| 192 | 17.5 |
| 197 | 17.5 |
| 198 | 18 |
| 202 | 18 |
| 203 | 18.5 |
| 208 | 18.5 |

The stature is expressed as the first and the last numbers to the nearest 0.5 cm of the corresponding distance According to the earlier mentioned study of Marcus et al (2018), the distance from the fifth intercostal space to the fourth intercostal space was 2.8 cm. For practical reasons, the present inventors suggest using 3 cm as the distance between the fifth and fourth intercostal spaces (cf. FIG. 1, distance between the horizontal level for the electrodes for lead V4, V5, and V6 (102), and the horizontal level for the electrodes V1 and V2 (103) along the sternal midline (101)). The same distance was also recommended by Rautaharju et al 1998.

In an Australian study (Franklin D 2011), mean sternal width at the fourth intercostal space in men was 33.17 mm, SD 5.82 mm, and ranged from 23.3 mm to 47.2 mm, and was in women 29.06 mm, SD 4.77 mm, ranging from 20.6 mm to 44.6 mm, respectively. In a study conducted in Turkey (Ekizoglu O 2014) the corresponding sternal width in men was 34.1 mm, SD 5.4 mm, and 30.2 mm, SD 6.3 mm, in woman. In the study of Macaluso P J Jr 2013, the size in sternal width were 35.36 mm, SD 0.62 mm, ranging from 25.5 mm to 48.5 mm in men, and 30.15 mm, SD 5.5 mm, ranging from 21.1 mm to 45.9 mm in women.

In these studies, the mean sternal width at the fourth intercostal space was 34.2 mm in men, and 29.8 mm in women. The mean upper limit of the range was 47.9 mm in men, and 45.3 mm in women.

The present inventors found this data to suggest positioning the electrodes for the leads V1 and V2 3 cm from the sternal midline to the subject's right and left, respectively (cf. FIG. 1, distance between sternal midline (101) and the position of the electrode for lead V1 (104) and the position for the electrode of lead V2 (105) along the horizontal level of the electrodes for lead V1 and V2 (103)). In that way, the midpoint of electrodes for the leads V1 and V2 were 0.65 mm from the sternal border, when the sternal width was at the upper limit of width, 47 mm. Such positioning of the electrodes for leads V1 and V2 avoids an estimation of the electrode positions based on unreliable palpation of the sternal border.

Human thoracic circumference is about half of the stature (Koepke et al 2017, Bum et Boncho 2018 and Foumani et al. 2015). Therefore, the present inventors suggest using $\frac{1}{16}$ of the stature/body height as the distance between the sternal midline and the electrode for the lead V4 on the horizontal level of the electrodes for the leads V4, V5 and V6 (Table II; see also FIG. 1, distance between the sternal midline (101) and the position of the electrode for lead V4 (107) along the horizontal level of the electrodes V4, V5 and V6 (102)), and $\frac{1}{8}$ of the stature as the distance between the sternal midline and the electrode for the lead V6, corresponding the "half point method" used by Rautaharju et al 1998. In other words, the distance between the sternal midline and the electrode for the lead V6 on the horizontal level of the electrodes for the leads V4, V5 and V6 is twice the distance between the sternal midline and the electrode for the lead V4 on the horizontal level of the electrodes for the leads V4, V5 and V6.

TABLE II

Estimation of the distance between the sternal midline and the position of the electrode for lead V4 in proportion to the subject's stature/body height in cm. Said distance is rounded to the nearest 0.5 cm.

| Stature/Body Height in cm | Distance to V4 in cm |
| --- | --- |
| 148 | 9.5 |
| 155 | 9.5 |
| 156 | 10 |
| 163 | 10 |
| 164 | 10.5 |
| 171 | 10.5 |
| 172 | 11 |
| 179 | 11 |
| 180 | 11.5 |
| 187 | 11.5 |
| 188 | 12 |
| 195 | 12 |
| 196 | 12.5 |
| 203 | 12.5 |
| 204 | 13 |
| 211 | 13 |

The stature is expressed as the first and the last numbers to the nearest 0.5 cm of the corresponding distance The distance of the electrode for the lead V5 from the sternal midline is 3×stature/32 (Table III).

TABLE III

Estimation of the distance between the sternal midline and the position of the electrode for lead V5 in proportion to the subject's stature/body height in cm. Said distance is rounded to the nearest 0.5 cm.

| Stature/Body Height in cm | Distance to V5 in cm |
|---|---|
| 141 | 13.5 |
| 146 | 13.5 |
| 147 | 14 |
| 151 | 14 |
| 152 | 14.5 |
| 156 | 14.5 |
| 157 | 15 |
| 162 | 15 |
| 163 | 15.5 |
| 167 | 15.5 |
| 168 | 16 |
| 172 | 16 |
| 173 | 16.5 |
| 177 | 16.5 |
| 178 | 17 |
| 183 | 17 |
| 184 | 17.5 |
| 188 | 17.5 |
| 189 | 18 |
| 194 | 18 |
| 195 | 18.5 |
| 199 | 18.5 |
| 200 | 19 |
| 204 | 19 |
| 205 | 19.5 |
| 210 | 19.5 |

The stature is expressed as the first and the last numbers to the nearest 0.5 cm of the corresponding distance The "half point" between the electrodes for the leads V2 and V4 is calculated from the hypotenuse of the right-angled triangle formed by electrodes for the leads V2 ((105) in FIGS. 1) and V4 ((107) in FIG. 1) and the horizontal line of the electrodes for the leads V4, V5 and V6 ((102) in FIG. 1). When the stature is 175 cm, the coefficient is 0.024. Because the possible deviation is insignificant for subjects with a body height/stature between 150 cm and 200 cm (+0.08 cm when the stature is 150 cm and −0.2 cm when the stature is 200 cm), the same coefficient is used for all subjects (Table IV).

TABLE IV

Estimation of the distance between the position of the electrode for lead V2 and the position of the electrode for lead V4 in proportion to the subject's stature/body height in cm. Said distance is rounded to the nearest 0.5 cm.

| Stature/Body Height in cm | Distance V2 to V3 in cm |
|---|---|
| 140 | 3.5 |
| 156 | 3.5 |
| 157 | 4 |
| 177 | 4 |
| 178 | 4.5 |
| 196 | 4.5 |
| 197 | 5 |
| 218 | 5 |

Figure 7:
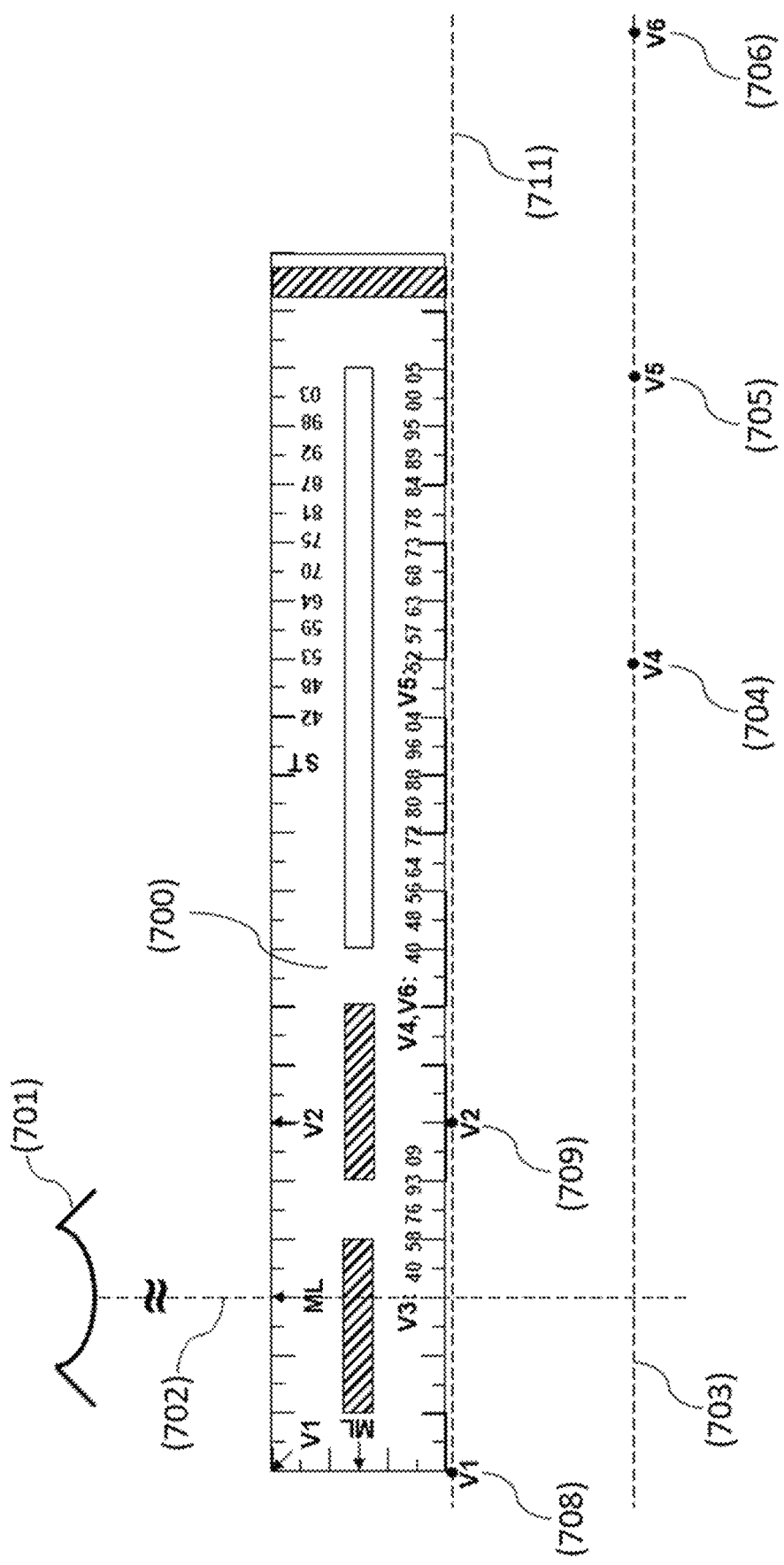
FIG. 7 shows the subject's sternal midline (702) extending perpendicular from the subject's sternal notch (701), and the horizontal level for the position of the electrodes for leads V4, V5 and V6 (703), and the position of the electrodes for leads V4 (704), V5 (705) and V6 (706), as exemplarily shown in FIGS. 4 and 5. The device of the present disclosure (700) can be aligned with the marks for the position of the electrodes for leads V1 (708) and V2 (709), such that the device's first longer side is aligned with the horizontal level of the positions for the electrodes for leads V1 and V2 (711).

The stature is expressed as the first and the last numbers to the nearest 0.5 cm of the corresponding distance In view of the foregoing mean values, standard deviations and ranges reported in the various pieces of scientific literature, and by referring to FIG. 1 and FIG. 7 for illustration only, the present disclosure provides a method for marking positions for six ECG electrodes for precordial leads V1-V6 on a human subject or a model of a human subject, wherein the method comprises the steps of (i) determining the horizontal level of the electrodes for leads V4, V5 and V6 (102, 703), wherein the horizontal level (102, 703) is determined to be between (0.088× body height) [cm] and (0.092×body height) [cm] downwards from the sternal notch (701) along the sternal midline (101, 702);

(ii) marking the position of the electrode for lead V1 (104, 708) from 2.8 cm to 3 cm above the horizontal level (102, 703) along the sternal midline (101, 702), and from 2.9 cm to 3.5 cm to the subject's right from the sternal midline (101, 702);

(iii) marking the position of the electrode for lead V2 (105, 709) from 2.8 cm to 3 cm above the horizontal level (102, 703) along the sternal midline (101, 702), and from 2.9 cm to 3.5 cm to the subject's left of the sternal midline (101, 702);

(iv) marking the position for the electrode for lead V4 (107, 704) at the horizontal level (102, 703) and (body height/16)±1 [cm] to the subject's left from the sternal midline (101, 702) along the surface of the thorax;

(v) marking the position for the electrode for lead V3 (106) from (0.023×body height) [cm] to (0.025×body height) [cm] from the position of the electrode for lead V2 (105, 709) to the direction of the position for the electrode for lead V4 (107, 704) along the connecting line formed by the position of the electrode for lead V2 (105, 709) and the position of the electrode for lead V4 (107, 704);

(vi) marking the position for the electrode for lead V5 (705) at the horizontal level (102, 703) and ((3×body height)/32)±1 [cm] to the subject's left from the sternal midline (101, 702) along the surface of the thorax; and (vii) marking the position for the electrode for lead V6 (706) at the horizontal level (102, 703) and (body height/8)±1 [cm] to the subject's left from the sternal midline (101, 702) along the surface of the thorax.

The term "thorax" and along with it the expression "surface of the thorax" has a precise and well-known meaning in human anatomy and in medicine. Anatomically, the most outer layer of the thorax is the skin. Accordingly, the expression "along the surface of the thorax" is intended to mean along the thoracic skin.

The above-described method may further comprise the step of positioning the six ECG electrodes for precordial leads V1-V6 at the positions identified in steps (ii) to (vii), thereby providing a method for positioning of six ECG electrodes for precordial leads V1-V6 on a human subject or a model of a human subject, wherein the method comprises the steps of (i) determining the horizontal level of the electrodes for leads V4, V5 and V6 (102, 703), wherein the horizontal level (102, 703) is determined to be between (0.088× body height) [cm] and (0.092×body height) [cm] downwards from the sternal notch (701) along the sternal midline (101, 702);

(ii) marking the position of the electrode for lead V1 (104, 708) from 2.8 cm to 3 cm above the horizontal level (102, 703) along the sternal midline (101, 702), and from 2.9 cm to 3.5 cm to the subject's right from the sternal midline (101, 702);

(iii) marking the position of the electrode for lead V2 (105, 709) from 2.8 cm to 3 cm above the horizontal level (102, 703) along the sternal midline (101, 702), and from 2.9 cm to 3.5 cm to the subject's left of the sternal midline (101, 702);

(iv) marking the position for the electrode for lead V4 (107, 704) at the horizontal level (102, 703) and (body height/16)±1 [cm] to the subject's left from the sternal midline (101, 702) along the surface of the thorax;

(v) marking the position for the electrode for lead V3 (106) from (0.023×body height) [cm] to (0.025×body height) [cm] from the position of the electrode for lead V2 (105, 709) to the direction of the position for the electrode for lead V4 (107, 704) along the connecting line formed by the position of the electrode for lead V2 (105, 709) and the position of the electrode for lead V4 (107, 704);

(vi) marking the position for the electrode for lead V5 (705) at the horizontal level (102, 703) and ((3×body height)/32)±1 [cm] to the subject's left from the sternal midline (101, 702) along the surface of the thorax;

(vii) marking the position for the electrode for lead V6 (706) at the horizontal level (102, 703) and (body height/8)±1 [cm] to the subject's left from the sternal midline (101, 702) along the surface of the thorax; and (viii) positioning the six ECG electrodes for precordial leads V1-V6 at the positions identified in steps (ii) to (vii).

In accordance with the foregoing explanation, as well as mean values, standard deviations and ranges reported in the various pieces of scientific literature, the horizontal level (102, 703) is determined to be between (0.09×body height) [cm] and (0.091×body height) [cm] downwards from the sternal notch along the sternal midline (101, 702), and in particular (0.09×body height) [cm] downwards from the sternal notch along the sternal midline (101, 702).

In embodiments, the position of the electrode for lead V1 (104, 708) is from 2.9 cm to 3 cm above the horizontal level (102, 703) along the sternal midline (101, 702), preferably the position of the electrode for lead V1 (104, 708) is 3 cm above the horizontal level (102, 703) along the sternal midline (101, 702). Alternatively or in addition, the position of the electrode for lead V1 (104, 708) is from 2.9 cm to 3.5 cm to the subject's right from the sternal midline (101, 702), preferably the position of the electrode for lead V1 (104, 708) is from 3.0 cm to 3.4 cm to the subject's right from the sternal midline (101, 702), more preferably the position of the electrode for lead V1 (104, 708) is from 3.0 cm to 3.3 cm to the subject's right from the sternal midline (101, 702), even more preferably the position of the electrode for lead V1 (104, 708) is from 3.0 cm to 3.2 cm to the subject's right from the sternal midline (101, 702), still more preferably the position of the electrode for lead V1 (104, 708) is from 3.0 cm to 3.1 cm to the subject's right from the sternal midline (101, 702), and most preferably the position of the electrode for lead V1 (104, 708) is 3.0 cm to the subject's right from the sternal midline (101, 702), as also shown in FIG. 1.

Likewise, in embodiments, the position of the electrode for lead V2 (105, 709) is from 2.9 cm to 3 cm above the horizontal level (102, 703) along the sternal midline (101, 702), preferably the position of the electrode for lead V2 (105, 709) is 3 cm above the horizontal level (102, 703) along the sternal midline (101, 702). Alternatively or in addition, the position of the electrode for lead V2 (105, 709) is from 2.9 cm to 3.5 cm to the subject's left from the sternal midline (101, 702), preferably the position of the electrode for lead V2 (105, 709) is from 3.0 cm to 3.4 cm to the subject's left from the sternal midline (101, 702), more preferably the position of the electrode for lead V2 (105, 709) is from 3.0 cm to 3.3 cm to the subject's left from the sternal midline (101, 702), even more preferably the position of the electrode for lead V2 (105, 709) is from 3.0 cm to 3.2 cm to the subject's left from the sternal midline (101, 702), still more preferably the position of the electrode for lead V2 (105, 709) is from 3.0 cm to 3.1 cm to the subject's left from the sternal midline (101, 702), and most preferably the position of the electrode for lead V2 (105, 709) is 3.0 cm to the left from the sternal midline (101, 702), as also shown in FIG. 1.

In further embodiments, the position for the electrode for lead V4 (107, 704) is at the horizontal level (102, 703) and (body height/16)±0.8 [cm], preferably (body height/16)±0.6 [cm], more preferably (body height/16)±0.4 [cm], even more preferably (body height/16)±0.2 [cm], and most preferably (body height/16) [cm] to the subject's left from the sternal midline (101, 702) along the surface of the thorax, as also shown in FIG. 1.

In still further embodiments, the position for the electrode for lead V3 (106) is from (0.024×body height) [cm] to (0.025×body height) [cm], or from (0.023×body height) [cm] to (0.024×body height) [cm] from the position of the electrode for lead V2 (105, 709) to the direction of the position for the electrode for lead V4 (107, 704). However, as noted above, the position for the electrode for lead V3 (106) can be well calculated to be (0.024×body height) [cm] from the position of the electrode for lead V2 (105, 709) to the direction of the position for the electrode for lead V4 (107, 704).

Similarly, in embodiments, the position for the electrode for lead V5 (705) is at the horizontal level (703, 102) and may be ((3×body height)/32)±0.8 [cm], preferably ((3×body height)/32)±0.6 [cm], more preferably ((3×body height)/32) ±0.4 [cm], even more preferably ((3×body height)/32)±0.2 [cm], and most preferably ((3×body height)/32) [cm] to the subject's left from the sternal midline (702, 101) along the surface of the thorax.

Further embodiments are directed to methods, wherein the position for the electrode for lead V6 (706) is at the horizontal level (703, 101) and (body height/8)±0.8 [cm], preferably (body height/8)±0.6 [cm], more preferably (body height/8)±0.4 [cm], even more preferably (body height/8) ±0.2 [cm], and most preferably (body height/8) [cm] to the subject's left from the sternal midline (702, 101) along the surface of the thorax.

A particularly useful embodiment contemplated by the inventors is fulfilled in case (a) the horizontal level (102, 703) is determined to be (0.09×body height) [cm] downwards from the sternal notch (701) along the sternal midline (101, 702);

(b) the position of the electrode for lead V1 (104, 708) is 3 cm above the horizontal level (102, 703) along the sternal midline (101, 702);

(c) the position of the electrode for lead V2 (105, 709) is 3 cm above the horizontal level (102, 703) along the sternal midline (101, 702);

(d) the position of the electrode for lead V1 (104, 708) is 3.0 cm to the subject's right from the sternal midline (101, 702);

(e) the position of the electrode for lead V2 (105, 709) is 3.0 cm to the subject's left from the sternal midline (101, 702);

(f) the position for the electrode for lead V4 (107, 704) is at the horizontal level (102, 703) and (body height/16) [cm] to the subject's left from the sternal midline (101, 702) along the surface of the thorax;

(g) the position for the electrode for lead V3 (106) is (0.024×body height) [cm] from the position of the electrode for lead V2 (105, 709) to the direction of the position for the electrode for lead V4 (107, 704);

(h) the position for the electrode for lead V5 (705) is at the horizontal level (102, 703) and ((3×body height)/32)

[cm] to the subject's left from the sternal midline (101, 702) along the surface of the thorax; and (i) the position for the electrode for lead V6 (706) is at the horizontal level (102, 703) and (body height/8) [cm] to the subject's left from the sternal midline (101, 702) along the surface of the thorax.

Apart from providing the advantage of a correct and accurate anatomic placement of ECG chest electrodes, the method of the present disclosure provides the additional advantage of a highly reproducible electrode placement, e.g. in the context of serial examinations on the same subject. Such serial examination are, for example, essential for estimation of real changes in ECG amplitudes.

In the conventional method, the anatomical locations are determined by subjective and inaccurate measures such as visually and by palpation, representing a particular problem in obese subjects. In particular, the positions of the electrodes for the lead V1 and V2 are traditionally at the sternal border on the fourth, right or left intercostal space. However, even more difficult than accurate palpation of intercostal spaces, is in practice the reliable palpation of the sternal border, in particular in obese subjects.

Having regard to the width of the sternum, in the conventional method, the midpoints of the electrodes for the leads V1 and V2 are 2.1 cm lateral from the midline of the sternum, if the sternum width is 3.2 cm, which is the mean value.

In the conventional method, the position of the electrode for the lead V4 is at the horizontal level of the fifth intercostal space at the midclavicular line. However, the determination of the horizontal level of the fifth intercostal space is ambiguous, because the intercostal space bends up to the sternum and it is identified by subjective and inaccurate palpation, more so ever in obese subjects. Finally, also the visual estimation of the midclavicular line is unreliable, especially in obese subjects.

In the conventional method, the electrode for the lead V5 is at the horizontal level of the lead V4 at the anterior axillary line. As mentioned before, the visual estimation of the anterior axillary line is unreliable, in particular in obese subjects.

In the conventional method the electrode for the lead V6 is at the same horizontal level as the electrodes for the leads V4 and V5 at the inaccurate, visually estimated midaxillary line.

Consequently, the positions of ECG chest electrodes always diverge in serial examinations. In contrast thereto, for the location of the electrodes in the method of the present disclosure, the skilled person only needs to palpate the sternal notch (also called jugular notch). This is easy and accurate, even in obese subjects. Therefore, when applying the method of the present disclosure, the mistakes in defining the electrode positions are reduced and electrode locations are more reproducible.

In the method of the present invention, the midpoints of the electrodes of the leads V1 and V2 are about 3 cm lateral from the midline of the sternum, i.e. about 0.9 cm farther than in the conventional method. The distance is always the same in serial measurements and the electrode is not on the sternum at the upper limit of the range of the width of the sternum (4.7 mm). The horizontal level of the electrode for the lead V4 is always about 9% of the stature/body height of the subject downward from the sternal notch, and at the midpoint between the sternal midline and the position of the electrode for the lead V6 measured along the surface of the thorax, body height/16 in cm to the subject's left from the sternal midline measured along the surface of the thorax.

The electrode for the lead V5 is at the horizontal level of the electrode for the lead V4 at the midpoint between the electrodes for the leads V4 and V6, calculated as about 3×stature/32 cm to the subject's left from the sternal midline, measured along the surface of the thorax. The electrode for the lead V6 is also at the same horizontal level as the electrodes for the leads V4 an V5, in a defined distance of body height/8 in cm to the subject's left from the sternal midline. The position of the electrode of the lead V3 is at the midpoint between the electrodes for the leads V2 and V4 in both the conventional and the present method. However, in the conventional method, the position is determined visually, whereas in the method of the present disclosure by exact measurements.

In view of the foregoing, the method of the present invention provides advantages when practiced on a human subject, in particular on an obese human subject. Additional advantages can be achieved, when the method is carried out on the same subject on at least two different time points, e.g. in the course of serial examinations.

From a technical point of view, it would be possible to define anatomically accurate and reproducible ECG chest electrode positions in many different ways. For instance by surface mapping, laser devices and photographing could be used. However, none of the methods and devices proposed so far have been accepted by the clinical users (laboratory nurses and bioanalysts). All these methods and devices have been considered too complicated, too difficult, too slow or too expensive.

Addressing these backdraws, a further aspect of the present invention pertains to a device, which implements and simplifies the method of the present disclosure as described herein above. Hence, referring to FIG. 2 and FIG. 7 for illustration purposes only, the present disclosure further provides a device, which is suitable for use in a method as defined herein above, wherein the device is in the form of a rectangular sheet of a flexible material, having an upper short side (201) and a lower short side (202), and a first long side (203) and a second long side (204). In principle, any suitable flexible material may be used, which is flexible enough to be aligned along the surface of the subject's thorax, and rigid enough to safeguard marking of the horizontal levels for the electrodes for leads V1 and V2, or the electrodes for leads V4, V5 and V6. Suitable materials may include certain plastic polymers, or thin metal sheets. Other suitable materials will be known to the skilled person.

In an advantageous embodiment, the length of each short side (201, 202) is equal to the distance between the horizontal level of the electrodes for leads V1 and V2 (103, 711), and the horizontal level of the electrodes for leads V4, V5, and V6 (102, 703). Thus, the breadth of the device is at least partly determined by the mean breadth of the sternum, that is 3.2 cm. The marking of the sternum midline and the horizontal level of the electrodes for the leads V4, V5 and V6 through the longitudinal slot (206) in the midline of the device is most accurate in case the breadth of the device is the same as the breadth of the sternum. If the device is much narrower would it be more difficult to see the markings on the device. Therefore, each short side (201, 202) may have a length of from 2.8 cm to 3.2 cm. Preferably, each short side (201, 202) may have a length of from 2.8 cm to 3.1 cm, more preferably from 2.8 cm to 3.0 cm, and even more preferably from 2.9 cm to 3.0 cm. If the breadth of the device is 3 cm, the marking of the horizontal level of the electrodes for the leads V1 and V2 is easiest. Therefore, in a particularly preferred embodiment, each short side (201, 202) has a length of 3.0 cm.

Skeletal dimensions derived from the stature of the subject must be seen on the device on their right places. This matter determines the length of the device. In order to apply the device for a 210 cm long person, the minimum length of the device is 18.9 cm (0.09×205 cm=the length of the sternum downward from the sternal notch). Hence, each long side (203, 204) of the device may have a length of at least 19 cm. Generally, the skilled practitioner will prefer a shorter device for the sake of practicability, and because shorter devices can be better aligned to the subject's surface of the thorax. Such shorter devices can be obtained when 'combining' the marks for the position for the electrode for lead V4 and V6, as will be explained in more detail herein below. This specific embodiment is also show in (211) in FIG. 2. In case the marks for the position for the electrode for lead V4 and V6 are not 'combined' in the device (not shown in FIG. 2), the marks for the position for the electrode for lead V6 for different body heights will determine the lower length limit of the longer sides (203 and 204). In this case, the longer sides (203, 204) need to have the length of about twice the distance from the upper short side to the marks for the electrode for lead V4 for different body heights. Considering the different distances provided in Table II above, in this case the longer sides of the device (203, 204) will be at least 26 cm in length (two times the maximum distance set out in Table II above). The device may be longer than the minimum required length, for example in order to improve the handling of the device, such as by incorporating space for grasping the device, or for incorporating a transverse handle (214) to the lower end of the device. Hence, in further embodiments, the length of each long side (203, 204) is at least 19.5 cm, more preferably at least 20.0 cm, even more preferably at least 20.5 cm, and still more preferably at least 21.0 cm.

However, in a preferred embodiment, the marks for the position of the electrodes for leads V4 and V6 are combined, and the length of the longer sides (203, 204) is 21.0 cm each.

In order to facilitate alignment of the device to the sternal midline, the midline of the device (205) is marked as 'ML' on the upper short side (201) of the device.

Figure 2:
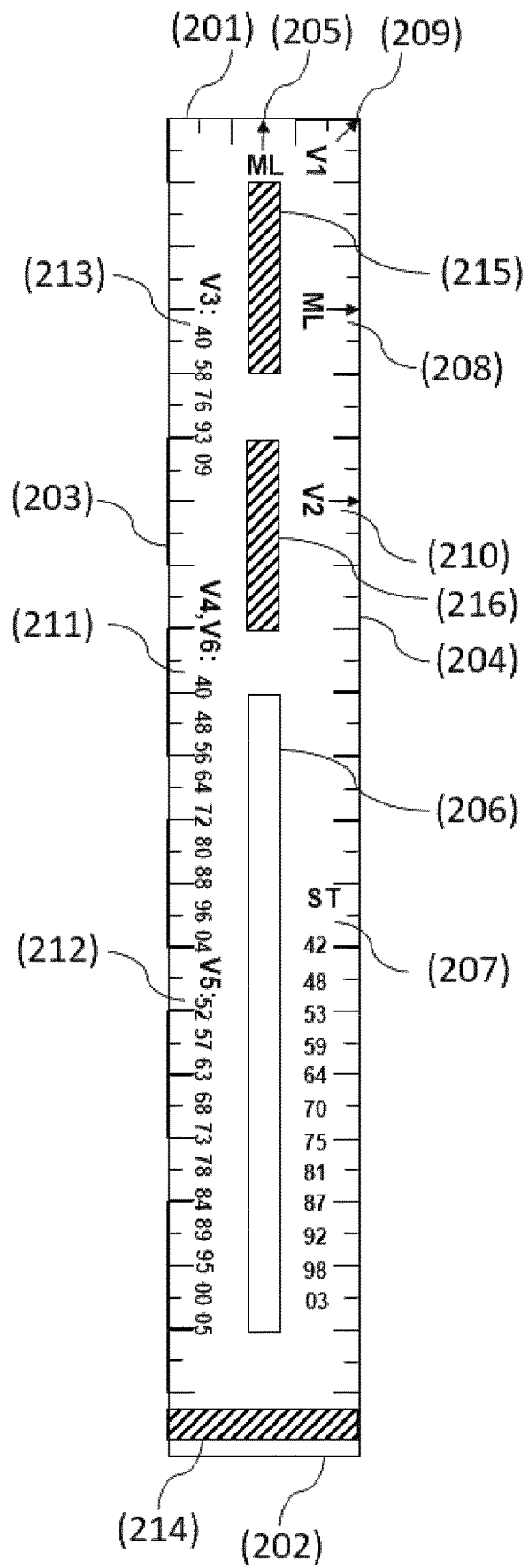
FIG. 2 shows a preferred embodiment of the device of the present disclosure. The device is shown on a 1:1 scale. Some of the sides of the device may carry marks; the distance between two longer lines is 1 cm, and the distance between a longer line and a shorter line is 0.5 cm. Said device exhibits an upper short side (201) and a lower short side (202) (preferably 3 cm in length), a first longer side (203) and a second longer side (204) (preferably 21 cm in length). The first long side ((203), here on the left) will lie on the subject's right side, when in use. The second long side (204) (here on the right) will be on the subject's left side, when in use. The device has a mark on the upper short side (205) for a longitudinal alignment of the device with the sternal midline (here marked with an arrow and 'ML' for midline). The device further exhibits a longitudinal slot (206), which can be used for marking the sternal midline on the patient, and for marking the position of the horizontal level for the position of the electrodes for lead V4, V5, and V6 (102) in accordance with the marks (207) provided for different statures ('ST') or body heights of a patient. One of the longer sides, preferably the second longer side (204), shows marks for the position of the electrode for lead V1 (209), for the position of the electrode for lead V2 (210), and for the midpoint between said positions (208), which also defines the position of the sternal midline ('ML'). The opposing long side, here the first long side (203), carries marks for the position of the electrode for the lead V3 (213), V4 (211), and V5 (212) for different body heights. The device of FIG. 2 shows a preferred embodiment in which the marks for the position for the electrode for lead V6 are identical to the marks for the position for the electrode for lead V4 (211). Further exemplified is a traverse handle (214) at the lower end of the device, and two longitudinal handles (215, 216) positioned on the upper end of the device.

A long side of said device (203, 204) carries a mark indicating the distance between the position for the electrode for lead V1 and the position for the electrode for lead V2 (210), starting from the corner (209) of the upper short side (201) and along the long side of said device (203, 204). Optionally, said corner (209) of said upper short side (201) carries a mark indicating the position of the electrode for the lead V1 (209), as also illustrated in FIG. 2. The distance between the corner of said upper short side (201) and said mark indicating the position for the electrode for lead V2 (210) on said long side (203, 204) may be a value from 5.8 cm to 7.0 cm, such as from 5.9 cm to 6.5 cm. However, in accordance with the preferred embodiment illustrated in FIG. 1, in a most preferred embodiment, the distance between the corner of said upper short side (201) and said mark indicating the position for the electrode for lead V2 (210) on said long side (203, 204) is 6 cm. In a preferred embodiment, the marks are provided on the second long side (204).

Further indicated is the middle point ('ML') (208) in between said corner (209) of the upper short side (201) and said mark indicating the position for the electrode of lead V2 (210). As will be explained herein below, said middle point or midline 'ML' assists in aligning the device to the sternal midline in the placement of the electrodes for lead V1 and lead V2.

The device comprises along its longitudinal midline a slot (206) for marking the position of the horizontal level of the electrodes for the leads V4, V5 and V6, and the direction of the sternal midline that is used for determining the square angle between the sternal midline and the horizontal line of the electrodes for the leads V4, V5 and V6. Said longitudinal slot (206) has a width, which allows marking of the sternal midline on the subject's chest using a suitable pen or marker. Typically, the width may range from 0.1 cm to 1.0 cm, preferably from 0.2 cm to 0.8 cm, more preferably from 0.4 cm to 0.6 cm, and most preferably the longitudinal slot (206) has a width of 0.5 cm.

The device carries marks indicating the distance, starting from the upper short side (201), between the sternal notch and the position of said horizontal level of the electrodes for leads V4, V5, and V6 for different body heights (207) corresponding to the length of the subjects sternum (manubrium+corpus). The sternum length of the smallest and the longest body height typically determine the length of the slot. In accordance with the method of the present disclosure, the distance between said upper short side (201) and said marks indicating the horizontal level for the electrodes of the leads V4, V5, and V6 (207) are typically from (0.088×body height) [cm] to (0.092×body height) [cm], preferably from (0.09×body height) [cm] to (0.091×body height) [cm], and in particular (0.09×body height) [cm], optionally rounded to the nearest 0.5 cm, and said marks (207) indicate the body height corresponding to the such calculated distance. Therefore, the length of the slot is typically about 10 cm, and said longitudinal slot (206) begins from about 8 cm to about 10 cm from the upper short side (201), preferably about 9 cm from the upper short side (201). During the registration of ECG, the user of the device is on the left side of the subject. Therefore, the stature markings are preferably on the second long side (204) of the device.

The device carries marks indicating the distance, starting from a corner of the upper short side (201) and along a long side (203, 204), between the position of the electrode for lead V2 and the midpoint between the positions for the electrodes for the leads V2 and V4, thereby determining the position of the electrode for the lead V3 for different body heights (213). In a preferred embodiment, said marks are provided along the long side opposing the marks indicating the position for the electrode of lead V2 (210), more preferably along the first long side (203). In accordance with the method of the present disclosure, the distance between the corner of said upper short side (201) and said marks indicating the position for the electrode for lead V3 (213) is from (0.023×body height) [cm] to (0.025×body height) [cm], preferably from (0.024×body height) [cm] to (0.02× body height) [cm] or from (0.023×body height) [cm] to (0.024×body height) [cm], and most preferably (0.024×body height) [cm], optionally rounded to the nearest 0.5 cm, and said marks (213) indicate the body height corresponding to the such calculated distance.

The device additionally carries marks indicating the distance, starting from a corner of the upper short side (201) and along a long side (203, 204), from the sternal midline to the position of the electrode for the lead V4 on the horizontal level of the electrodes for leads V4, V5 and V6 for different body heights (211). During the registration of ECG, the user of the device is on the left side of the subject. Therefore, said marks are preferably provided along the long side opposing the marks indicating the position for the electrode of lead V2 (210), more preferably along the first long side (203). In accordance with the method of the present disclosure, the distance between the corner of said upper short side (201) and said mark indicating the position for the electrode for lead V4 (211) is (body height/16)±1.0 [cm], preferably (body height/16)±0.8 [cm], more preferably (body height/16)±0.6 [cm], even more preferably (body height/16)±0.4 [cm], still more preferably (body height/16)±0.2 [cm], and most preferably (body height/16) [cm], optionally rounded to the nearest 0.5 cm, and said marks (211) indicate the body height corresponding to the such calculated distance.

Moreover, the device carries marks indicating the distance, starting from a corner of the upper short side (201) and along a long side (203, 204), from the sternal midline to the position of the electrode for the lead V5 on the horizontal level of the electrodes for leads V4, V5 and V6 for different body heights (212). During the registration of ECG, the user of the device is on the left side of the subject. Therefore, said marks are preferably provided along the long side opposing the marks indicating the position for the electrode of lead V2 (210), more preferably along the first long side (203). In accordance with the method of the present disclosure, the distance between the corner of said upper short side (201) and said mark indicating the position for the electrode for lead V5 (212) is ((3×body height)/32)±1.0 [cm], preferably ((3×body height)/32)±0.8 [cm], more preferably ((3×body height)/32)±0.6 [cm], even more preferably ((3×body height)/32)±0.4 [cm], still more preferably ((3×body height)/32)±0.2 [cm], and most preferably ((3×body height)/32) [cm], optionally rounded to the nearest 0.5 cm, and said marks (212) indicate the body height corresponding to the such calculated distance.

Furthermore, the device carries marks indicating the distance, starting from a corner of the upper short side (201) and along a long side (203, 204), of the position of the electrode for the lead V4 on the horizontal level of the electrodes for leads V4, V5 and V6 for different body heights. During the registration of ECG, the user of the device is on the left side of the subject. Therefore, said marks are preferably provided along the long side opposing the marks indicating the position for the electrode of lead V2 (210), more preferably along the first long side (203). There are at least two general options how these marks are arranged to the marks indicating the position of the electrode for lead V4 and lead V5.

In the first 'short' option of the device, the marks indicating the position of the electrode for the lead V4 also indicate the distance between the position of the electrode for the lead V4 and the position of the electrode for the lead V6 on the horizontal level of the electrodes for leads V4, V5 and V6 for different body heights (211) (order of the marks: V4, V6-V5, as shown in FIG. 2). The marks (211) indicating the position for the electrode for lead V6 for different body heights are identical to the marks indicating the position for the electrode for the lead V4 (211). Said marks indicate the body height corresponding to the indicated distance. For practicability reasons, this option is preferred.

Alternatively, in the second 'long' option of the device, the distance between the corner of said upper short side (201) and said marks indicate the distance from the sternal midline to the position of the electrode for the lead V6 on the horizontal level of the electrodes for leads V4, V5 and V6 for different body heights (order of the marks: V4-V5-V6). In accordance with the method of the present disclosure, said distance is (body height/8)±1.0 [cm], preferably (body height/8)±0.8 [cm], more preferably (body height/8)±0.6 [cm], even more preferably (body height/8)±0.4 [cm], still more preferably (body height/8)±0.2 [cm], and most preferably (body height/8) [cm], optionally rounded to the nearest 0.5 cm. Said marks also indicate the body height corresponding to the such calculated distance.

A device implementing the most preferred embodiment of the method of the present disclosure has thus the following characteristics:

(a) the length of each short side (201, 202) is 3.0 cm; and (b) the length of each long side (203, 204) 21.0 cm; and (c) the distance between said upper short side (201) and said marks indicating the horizontal level for the electrodes of the leads V4, V5, and V6 (207) is (0.09×body height) [cm], rounded to the nearest 0.5 cm, and said marks (207) indicate the body height corresponding to the such calculated distance; and (d) the distance between the corner of said upper short side (201) and said mark indicating the position for the electrode for lead V2 (210) on said long side (204) is 6 cm, wherein said long side is the second long side (204), and wherein said corner of said upper short side carries a mark indicating the position of the electrode for the lead V1 (209); and (e) the distance between the corner of said upper short side (201) and said marks indicating the position for the electrode for lead V3 (213) is (0.024×body height) [cm], rounded to the nearest 0.5 cm, wherein said marks (213) are positioned along the first long side (203) and said marks (213) indicate the body height corresponding to the such calculated distance; and (f) the distance between the corner of said upper short side (201) and said mark indicating the position for the electrode for lead V4 (211) is (body height/16) [cm], rounded to the nearest 0.5 cm, wherein said marks are positioned along the first long side (203) and said marks (211) indicate the body height corresponding to the such calculated distance; and (g) the distance between the corner of said upper short side (201) and said mark indicating the position for the electrode for lead V5 (212) is ((3×body height)/32) [cm], rounded to the nearest 0.5 cm, wherein said marks (212) are positioned along the first long side (203) and said marks (212) indicate the body height corresponding to the such calculated distance; and (h) the distance between the corner of said upper short side (201) and said marks indicating the position for the electrode for lead V6 (211) is the distance between position of the electrode for the lead V4 and the position of the electrode for the lead V6 on the horizontal level of the electrodes for leads V4, V5 and V6, and the marks indicating the position for the electrode for lead V6 for different body heights (211) are identical to the marks indicating the position for the electrode for the lead V4 (211).

As noted above, it is preferred that the device has a transverse handle (214) below said longitudinal slot (206) of the device, and/or at least one, preferably two longitudinal handles (215, 216) above said longitudinal slot (206) of the device. For example, the longitudinal handles may be 3 cm in length and 1-2 cm apart from each other.

The device of the present disclosure can be advantageously used for marking positions for six ECG electrodes for precordial leads V1-V6 on a human subject or a model of a human subject, preferably on a human subject. Likewise, the device of the present disclosure can also be advantageously used for positioning of six ECG electrodes for precordial leads V1-V6 on a human subject or a model of a human subject, preferably on a human subject. Since the device implements the method of the present disclosure, the device is particularly useful in case the human subject is an obese human subject, or if the device is used in the context of at least two independent, probably serial, ECG measurements.

Hence, further provided is a method of marking positions for or for positioning of six ECG electrodes for precordial leads V1-V6 on a human subject or a model of a human subject.

Figure 3:
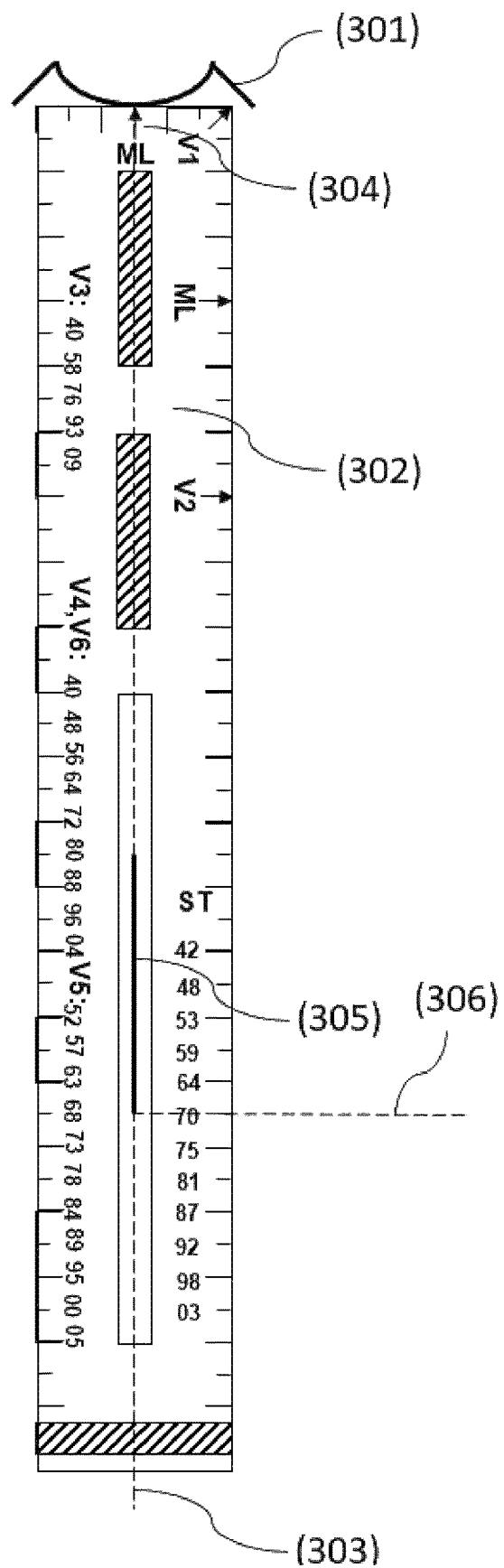
FIG. 3 shows a scheme, how the device of the present disclosure (302) is aligned with its sternal midline mark 'ML' on the upper short side (304) to the subject's sternal notch (301), such that the longitudinal slot of the device lies on the sternal midline (303). The sternal midline is marked on the subject's chest with a mark (305), which also provides an indication of the position of the horizontal level of the position of the electrodes for leads V4, V5 and V6 (306) (here exemplified for a subject with a body height of 170 cm; the horizontal level is marked at the position indicated with '70' of the 'ST'-marks).

In a first step, a device, for example a devise as shown in FIG. 2, is placed on the sternum of the subject, so that the upper short ends marking ML is at the midpoint of the sternal notch (also called jugular notch), and the device is directed straight toward foots of the subject. The longitudinal slot of the device is at the midline of the subject's sternum. The horizontal level of the electrodes for the leads V4, V5 and V6 is marked on the skin of the subject at the point indicated by the individual code for the subject (ST) through the longitudinal slot of the device using a marking pen, for instance an eye brow pen. This marking is lengthened about four cm straight toward the sternal notch for the later measurement of the square angle between the sternal midline and the horizontal line of the electrodes for the leads V4, V5 and V6. Thus, with reference to FIG. 3, the first method step is aligning the mark of the midline (205) of the upper short end (201) of a device according to the present disclosure (302) with the midpoint of the sternal notch (301), such that the longitudinal slot of said device (206) is at the midline of the subject's sternum (303), and marking (305) the midline of the subject's sternum (303) through the longitudinal slot of said device (206), and marking (305) the horizontal level of the electrodes for the leads V4, V5 and V6 (306) in accordance with the marks on the device (207) and the subject's body height.

Figure 4:
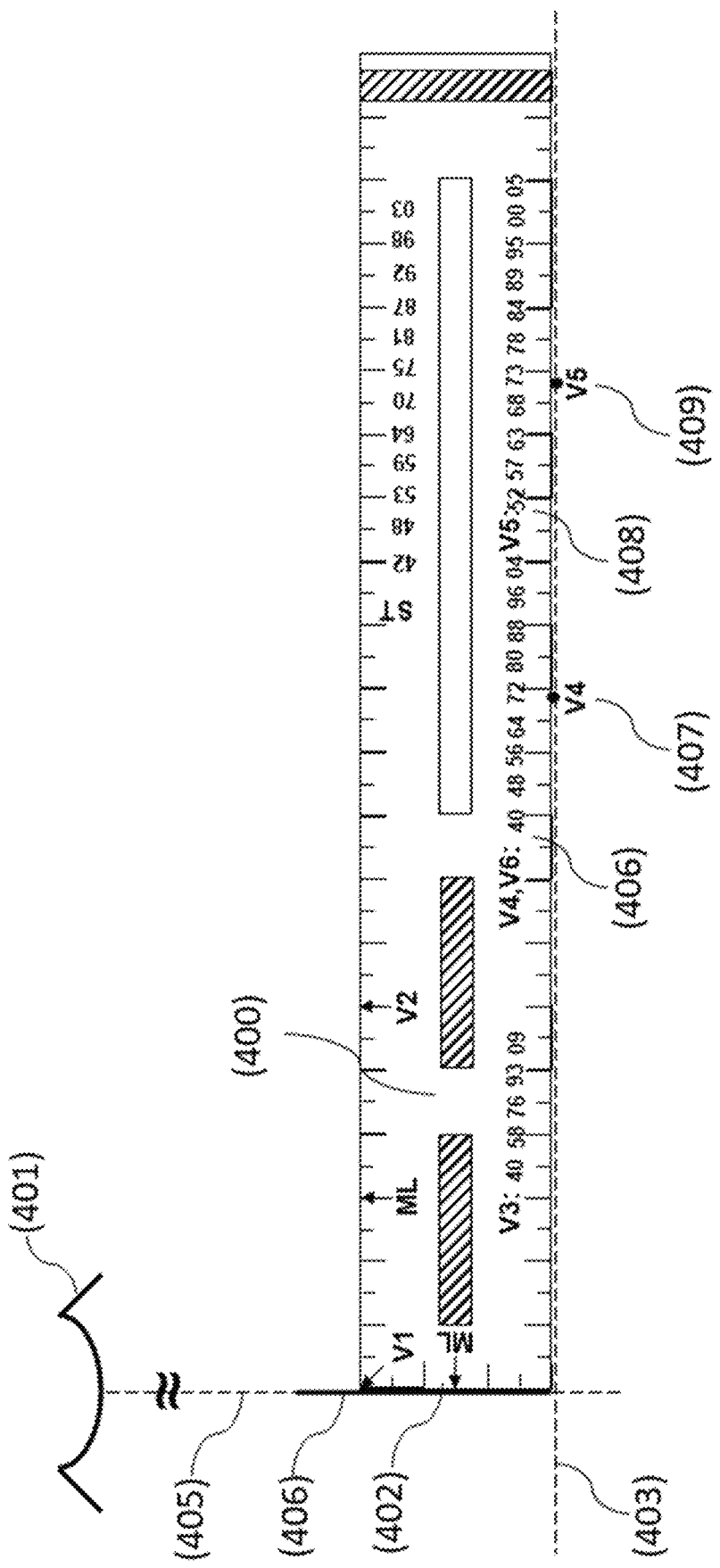
FIG. 4 shows how the device of the present disclosure (400) is aligned with the sternal midline (405) extending perpendicular from the sternal notch (401), and the horizontal level for the position of the electrodes for leads V4, V5 and V6 (403) in accordance with the mark (406), which was previously marked on the subject's chest through the device's longitudinal slot as shown in FIG. 3. Exemplified for a subject with a body height of 170 cm, the position for the electrode of the lead V4 (407) is marked on the subject's chest in accordance with the marks for the position of the electrode of lead V4 for different body heights (406) provided on the long side of the device. Likewise, also exemplified for a subject with a body height of 170 cm, the position for the electrode of the lead V5 (409) is marked on the subject's chest in accordance with the marks for the position of the electrode of lead V5 for different body heights (408) provided on the long side of the device.

Then, the device is turned 90 degrees counterclockwise and the short upper end is placed along the earlier marked sternal midline so, that the original right longer side of the device is at the horizontal level of the electrodes for the leads V4, V5 and V6, straight to the sternal midline. The individual positions of the electrodes for the leads V4 and V5, now visible on the lower long side of the device, are marked on the skin of the subject. Thus, referring to FIG. 4, this step comprises aligning the upper short side (402, 201) to the sternum's midline (405) marked in the preceding step (406, 305), and aligning the long side carrying the marks for the position of the electrodes for the leads V4 (406, 507), V5 (408) and V6 (406, 507) to the horizontal level (403, 503) marked in the preceding step (406, 305, 505), and marking the position for the individual positions for the electrodes for the lead V4 (407), V5 (409), and V6 (508) in accordance with the marks on the device (406, 408, 507) and the subject's body height.

Figure 5:
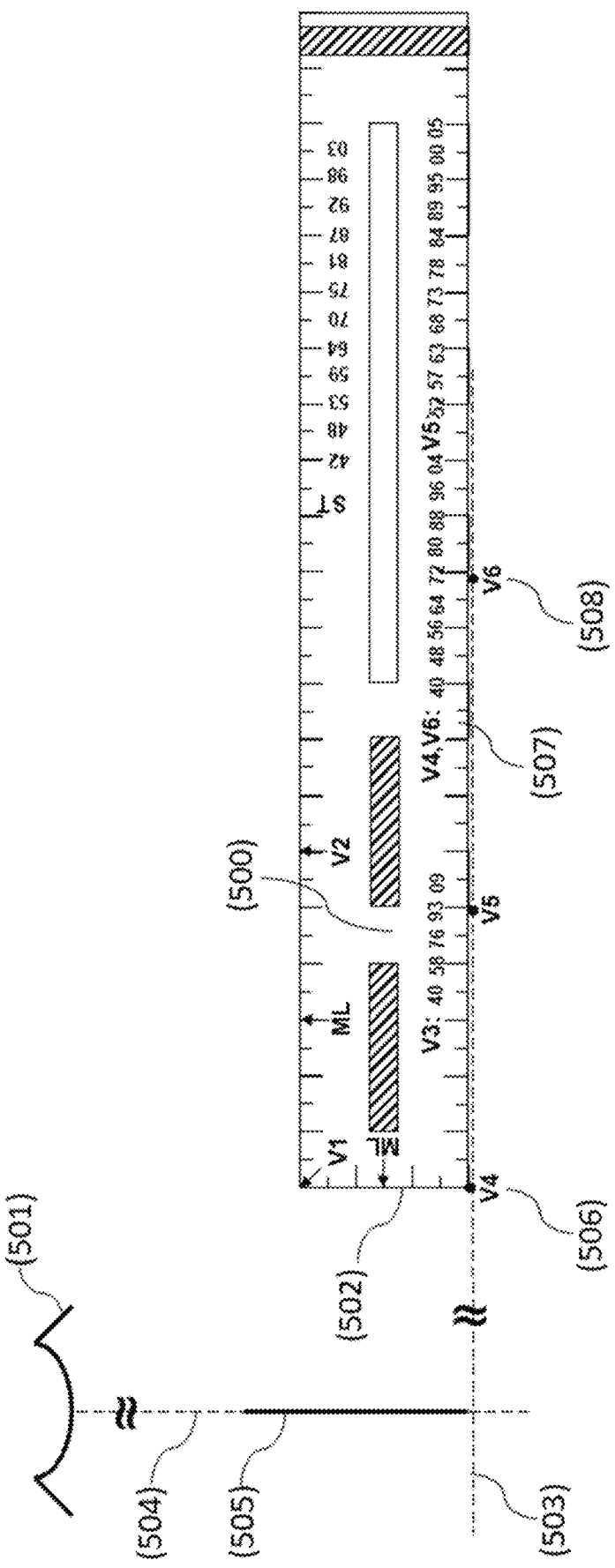
FIG. 5 shows how a preferred embodiment of the device of the present disclosure (500) can be aligned to the position of the electrode for lead V4 (506) and V5 (defining the horizontal level of the positions for the electrodes of leads V4, V5 and V6 (503)), in order to mark the position of the electrode for lead V6 (508) on the subject's chest using the marks for the position of the electrode of lead V6 for different body heights (406) provided on the long side of the device. In the shown embodiment, the marks on the device (500) defining the position of the electrode for lead V6 (507) are used for both, the position of the electrode for lead V4 and the position for the electrode for lead V6. Further shown in the subject's sternal notch (501), the sternal midline (504), and the mark (505) marking the position of the sternal midline (504) and the horizontal level for the position of the electrodes for leads V4, V5 and V6 (503).

In case the 'short' option of the device is used, the device is moved to the patient's left at the same horizontal level, such that the original upper short side is at the point of the electrode for the lead V4 (marked on the device V4, V6). Then the position of the electrode for the lead V6 marked. Hence, by referring to FIG. 5, this step may optionally comprise realigning the device (400, 500) with its corner, formed by the upper short side (201, 502) and the long side carrying the marks for the position of the electrode for lead V4 (406, 507), to the position for the electrode for lead V4 (407, 506) and with said long side carrying the marks for the position of the electrode for lead V4 (406, 507) to the marked position for the electrode for the lead V5 (409), in case the same marks on said long side of the device are used for determining the position of the electrode for the lead V4 and the lead V6 (211, 406, 507).

Figure 6:
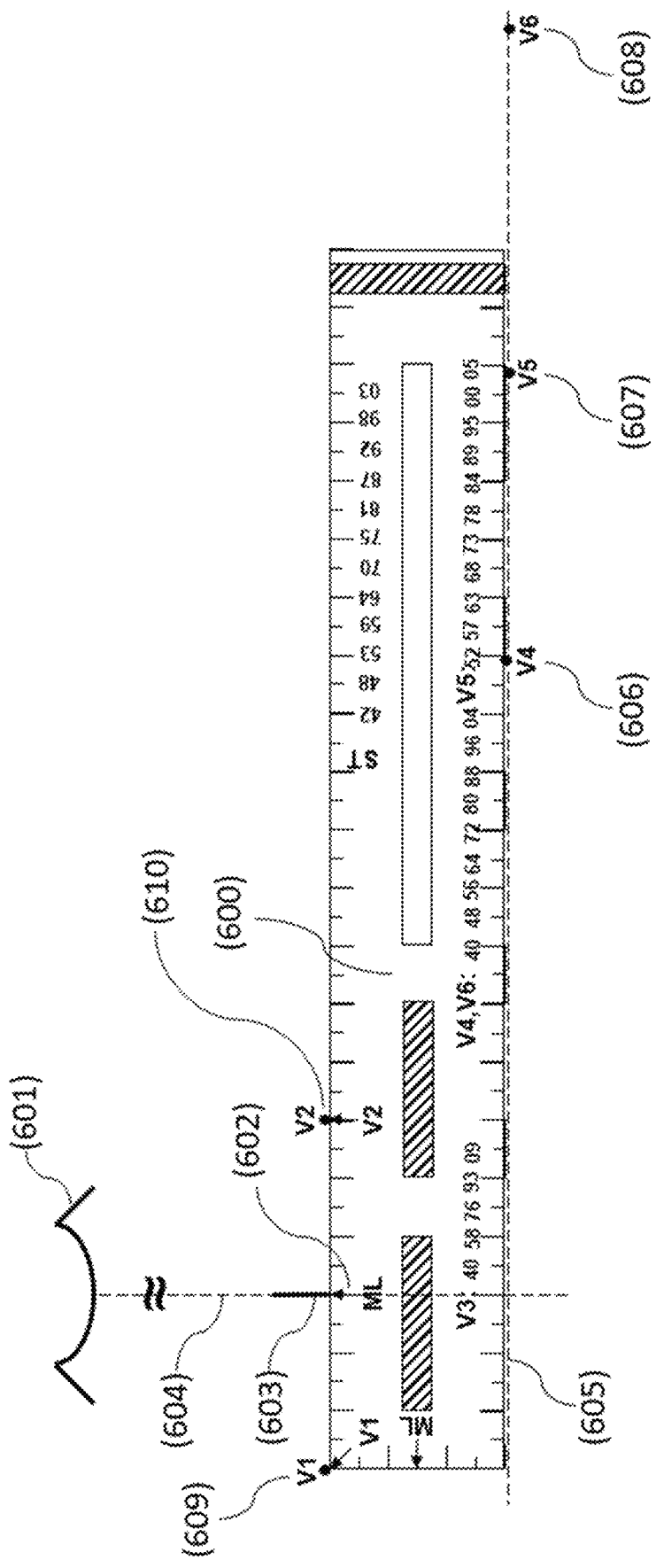
FIG. 6 shows the subject's sternal midline (604) extending perpendicular from the subject's sternal notch (601), and the horizontal level for the position of the electrodes for leads V4, V5 and V6 (605), as previously defined by a mark (603) marked on the subject's chest as shown in FIG. 3, and the position of the electrodes for leads V4 (606), V5 (607) and V6 (608), as exemplarily shown in FIGS. 4 and 5. The device of the present disclosure (600), having preferably a breadth of 3 cm, is aligned to the horizontal level (605) such that the mark for the midpoint/sternal midline ('ML') on the device (602) is aligned with the mark on the subject's chest (603). Now the position of the electrodes for the lead V1 (609) and the lead V2 (610) can be marked on the subject's chest in accordance with the respective marks (609, 610) on the dive (600).

Then, the device is moved to the subject's right at the same horizontal level, such that the marking 'ML' on the long, now upper, side of the device, is at the sternal midline. The position of the electrode for the lead V1 is now pointed by the marking V1 on the subject's right, by the upper corner of the device. The position of the electrode for the lead V2 is pointed by the marking V2 on the currently upper long side of the device. Both are marked on the skin of the subject. Hence, by referring to FIG. 6, the following step comprises aligning the device (600) such that the middle point between the marks for the position of the electrode for lead V1 and V2 (208, 602) is positioned 2.8 cm to 3.0 cm, preferably 2.9 cm to 3.0 cm, more preferably 3.0 cm, above the horizontal level for the electrodes for the leads V4, V5, and V6 (605), and on the sternum midline (604) marked in step (a) (603, 305), and marking the position for the electrodes for the leads V1 (609) and V2 (610) in accordance with the marks on the device (209, 210).

Figure 8:
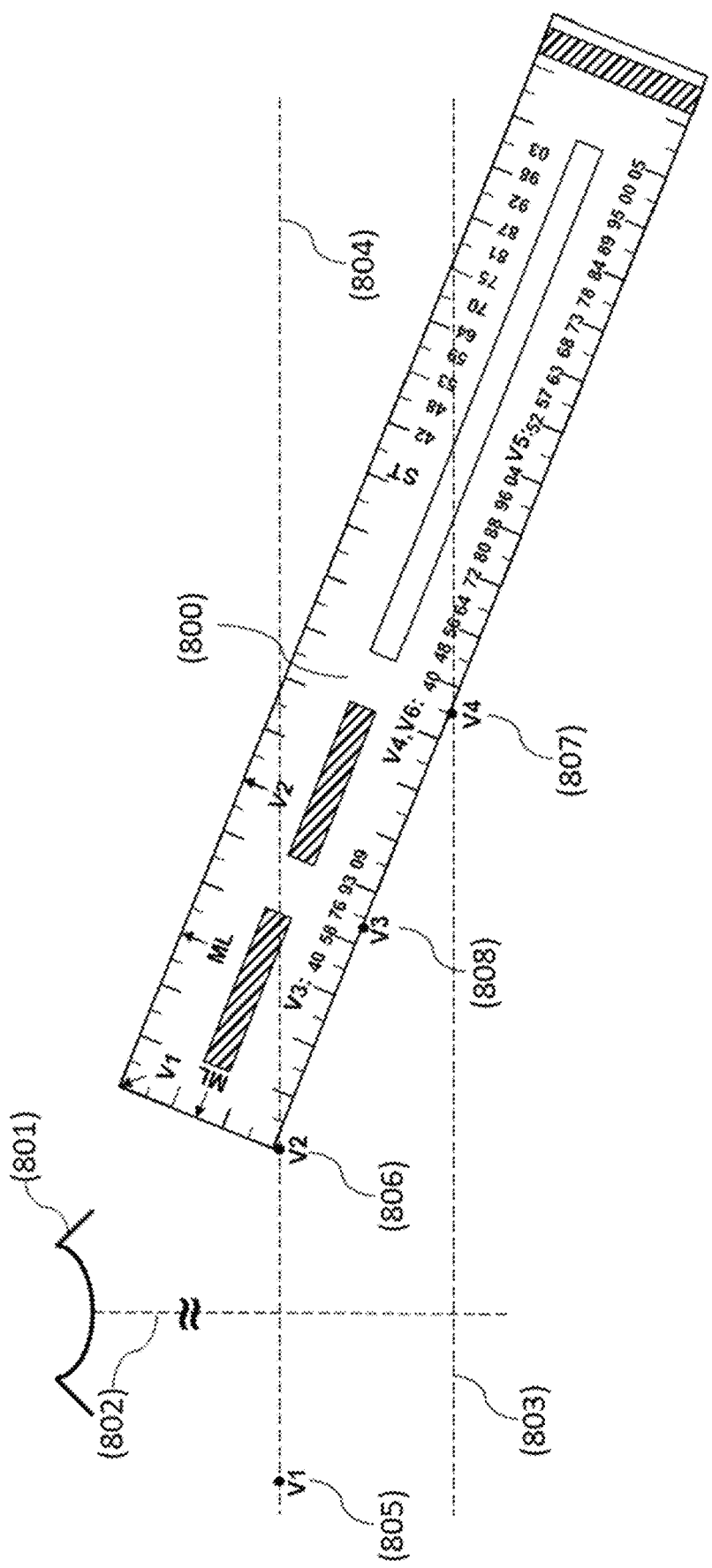
FIG. 8 shows the subject's sternal midline (802) extending perpendicular from the subject's sternal notch (801), and the horizontal level for the position of the electrodes for leads V4, V5 and V6 (803), and the marked position of the electrode for lead V4 (807), V1 (805) and V2 (806). The marked position for the electrodes for lead V1 (805) and V2 (806) define a second horizontal level (804).

The device is next moved towards the sternal notch at the same horizontal angle (straight to sternal midline), such that the first long side, directing now toward the foots of the subject is at the horizontal level of the electrodes for the leads V1 and V2 (FIG. 7.). The device is moved to left at the same horizontal level, such that the lower corner of the device is at the point of the electrode for the lead V2. Keeping this corner at the point of the electrode for the lead V2 the device is turned clockwise until the longer side of the device is along the line between the electrodes for the leads V2 and V4. In accordance with the subject's body height indicated on the longer side of the device, the position of the electrode for the lead V3 is determined and marked on the skin of the subject. Hence, with reference to FIG. 8, the next method step comprises aligning the corner formed by the upper short side (201) and the longer side carrying the marks for the position of the electrode for lead V3 (213) with the marked position for the electrode for the lead V2 (806), and simultaneously aligning the long side carrying the marks for the position of the electrode for lead V3 (213) with the marked position for the electrode for the lead V4 (807), and marking the position of the electrode for the lead V3 (808) in accordance with the marks on the device (213) and the subject's body height.

Finally, the method aims for positioning of six ECG electrodes for precordial leads V1-V6 on a human subject or a model of a human subject, the method comprises an additional step of positioning the six ECG electrodes for precordial leads V1-V6 at the positions identified in the preceding method steps.

A precise, reliable and reproducible placing of ECG chest electrodes is of particular importance in serial measurements, such as for determining changes in the amplitude of a subject's ECG. Traditionally in electrocardiogram, besides of rhythm and duration of waves, complexes and intervals, morphologic changes have aroused the greatest interest in physicians. Changes in absolute amplitudes have mostly been described as scaling effects. Maybe therefore the great variability in absolute amplitude measurements, especially in serial tracings, have been accepted so long.

For a long time, absolute amplitude criterions were used only in diagnostics of ventricular hypertrophy. However, the observations, that inaccurate amplitude measurements in serial examinations may change the morphology of ECG and so the diagnosis of serious conditions, like for instance, myocardial infarction, have led to a new consideration of the significance of accurate and reproducible amplitude measurements. Also the observations, that the development of hypertension can be predicted using amplitude measurements (Takase et al 2016), and also a small otherwise unnoticeable blood loss can be detected, if small changes in amplitude measurements in serial examinations can be found (FI patent 127488 B and U.S. Pat. No. 10,292,627 B2), are demanding a new thinking.

The present invention provides remarkable improvement on the presently used method for the definition of the positions of ECG chest electrodes, especially in serial tracings and in obese subjects.

In this context, further disclosed is a method of treatment or a diagnostic method, comprising the step of placing a device according to the present disclosure on the chest of a human subject to be treated or diagnosed.

Further disclosed is a method of measuring one or more ECGs on a human subject, comprising the step of placing a device according to the present disclosure on the chest of a human subject to be treated or diagnosed.

Additional method steps are disclosed above regarding the method of marking positions for or for positioning of six ECG electrodes for precordial leads V1-V6 on a human subject herein above. As noted above, applying the device in these methods is particularly advantageous in embodiments, wherein the human subject is an obese human subject, and/or wherein said method comprises measuring an ECG in two or more individual serial measurements on the same subject. As outlined above, a particular interest lies in embodiments, wherein said method comprises measuring changes in the subject's ECG over time, e.g., changes in the amplitude of the subject's ECG over time.

For the above reasons, the device can be advantageously applied in methods for diagnosing a disease characterized by an abnormal ECG. Even more advantages are provided in case the device is used in methods for diagnosing a disease, selected from ventricular hypertrophy, myocardial infarction, hypertension or the development of hypertension, and blood loss.

It will be obvious to a person skilled in the art that, as technology advances, the basic idea of the invention can be implemented in many different ways. The invention and its embodiments are thus not limited to the examples described above and as shown in the figures, but may vary within the scope of the claims.

REFERENCES

1. Kligfield et al.: Recommendations for the standardization and interpretation of electrocardiogram. J Am Coll Cardiol. 2007; 49: 1109-27.
2. Burnett C T.: Changes in the precordial electrocardiogram due the position of the exploring electrode. Rocky Mt Med J. 1947; 44: 107-15.
3. Kerwin A J, Mc Lean R, Tegelaar H. A method for the accurate placement of chest electrodes in the taking of serial electrocardiographic tracings.: Canad. M. A. J. 1960; 82: 258-261.
4. Zema M J, Luminais S K, Chiaramida S, Goldman M, Kligfield P.: Electrocardiographic poor R wave progression III. The normal variant. J Electrocardiol. 1980; 13: 135-42.
5. Larkin H, Hunyor S N.: Precordial voltage variation in the normal electrocardiogram. J Electrocardiol 1980; 13: 347-51.
6. Herman M V, Ingram D A, Levy J A, Cook J R, Athans R J. Variability of electrocardiographic precordial lead placement: a method to improve accuracy and reliability. Clin Cardiol. 1991; 14: 469-76.
7. Wenger W, Kligfield P.: Variability of precordial electrode placement during routine electrocardiography. J Electrocardiol. 1996; 29: 179-84.
8. McCann, Holdgate A, Mahammad R, Waddington A. Accuracy of ECG electrode placement by emergency department clinicians. Emerg Med Australas. 2007; 19: 442-8.
9. Rajaganeshan R, Ludlam C L, Francis D P, Parasramka S V, Sutton R. Accuracy in ECG lead placement among technicians, nurses, general physicians and cardiologists. Int J Clin pract. 2008; 62: 65-70.
10. Shoenberger J M, Voskanian S, Johnson S, Ahern T, Henderson S O. Left ventricular hypertrophy may be transient in the emergency department. WestJEM. 2009; 10: 140-143.
11. Kania M, Rix H, Fereniec M, Zavala-Fernandez H, Mroczka T, Stix G, Maniewski R. The effect of precordial lead displacement on ECG morphology. Med Biol Eng Comput 2014; 52: 109-119.
12. Anderson B W, Burns B. Anatomy, thorax, xiphoid process. StatPearls (internet). Treasure Island (FL): Stat Pearls Publishing; 2019-, 2018. Excerpt.
13. Rose G A. A calliper for siting the precordial leads in electrocardiography. Lancet 1961; 7167: 31.
14. Rautaharju P M, Wolf H K, Eifler W J, Blackburn H. A simple procedure for positioning precordial ECG and VCG electrodes using an electrode locator. J Electrocardiol. 1976; 9: 35-40.
15. Soliman E Z. A simple measure to control for variations in chest electrodes placement in serial recordings. J Electrocardiol. 2008; 41: 378-9.
16. Lehmann M H, Katona A M. Proposed bedside maneuver to facilitate accurate anatomic orientation for correct positioning of ECG precordial leads V1 and V2: a pilot study. J Emerg Med. 2012; 43: 584-92.
17. Marcus F, Hughes T, Barrios P, Borgstrom M. Clinical location of the fourth and fifth intercostal spaces as a percent of the length of the sternum. J Electrocardiol. 2018; 1: 55-59.
18. Takase H, Sugiura T, Murai S, Yamashita S, Ohte N, Dohi Y. Use of electrocardiography to predict future development of hypertension in the general population. Medicine (Baltimore) 2016; 95: e3483.
19. Yonguc G N, Kurtulus A, Bayazit O, Adiguzel E, Unal I, Demir S, Acar K. Estimation of stature and sex from sternal lengths: an autopsy study. Anat Sci Int. 2015: 90: 89-96.
20. Laurin L-P, Jobin V, Bellemare F. Sternum length and rib cage dimensions compare with bodily proportions in adults with cystic fibrosis. Can Respir J. 2012; 19: 196-200.
21. Macaluso P J Jr, Lucena J. Stature estimation from radiographic sternum length in a contemporary Spanish population. Int J Legal Med. 2014; 128: 845-51.
22. Zhang K, Luo Y Z, Fan F, Zheng J Q, Yang M, Li T, Pang T, Zhang J, Deng Z H. Stature estimation from sternum length using computed tomography-volume rendering technique images of western Chinese. J Forensic Leg Med. 2015; 35: 40-4.
23. Menezes R G, Kanchan T, Kumar G P, Rao P P, Lobo S W, Uysal S, Krishan K, Kalthur S G, Nagesh K R, Shettigar S. Stature estimation from the length of the sternum in South Indian males: a preliminary study. J Forensic Leg Med. 2009; 16: 441-3.
24. Tumram N K, Parchake S B, Bardale R V, Dixit P G. Estimation of height from the length of the sternum in an adult Indian population. Med Sci Law. 2016; 56: 46-52.

25. Rautaharju P M, Park L, Rautaharju F S, Crow R. A standardized procedure for locating and documenting ECG chest electrode positions. J Electrocardiol. 1998; 1: 17-29.
26. Franklin D, Flavel A, Kuliukas A, Cardini A, Marks M K, Oxnard C, gins P. Estimation of sex from sternal measurements in a western Australian population. Forensic Sci Int. 217 (2012) 230. e1-230. e5.
27. Ekizoglu O, Hocaoglu E, Inci E, Bilgili M G, Solmaz D, Erdil I, Ozgur I. Sex estimation from sternal measurements using multidetector computed tomography. Medicine 2014: 93(27): 1-5.
28. Macaluso P J Jr, Lucena J. Estimation of sex from sternal dimensions derived from chest plate radiographs in contemporary Spaniards. Int J Legal Med. 2014; 128: 389-95.
29. Koepke N, Zwahlen M, Wells J C, Bender N, Henneberg M, RUhli F J, Staub K. Comparison of 3D laser-based photonic scans and manual anthropometric measurements of body size and shape in a validation study of 123 young swiss men. PeerJ. 2017 Feb. 9; 5: e2980.
30. Lee B J, Ku B. A comparison of trunk circumference and width indices for hypertension and type 2 diabetes in a large-scale screening: a retrospective cross-sectional study. SCIENTIFIC REPORTS (2018) 8:13284.
31. Alavi Foumani A, Amin A, Tangestani Nejad A, Kazemnejad E, Salamat F, Massahnia S, Hassankhani A, Khoshgorazan L, Mirafallah Nasiri A, Mohammadi M. Correlation of the ratio of upper third to lower third circumferences of the chest with obstructive pattern in spirometry. Tanaffos 2015; 14:222-226
32. Simonson E, Schmitt O H, Dahl J, Fry D, Bakken E E. The theoretical and experimental bases of the frontal plane ventricular gradient and its spatial counterpart. American Heart Journal 1954; 47(1): 122-153.
33. CN 101828915 (A)
34. CN 106901725 (A),
35. CN 2698273 Y
36. JP H09271466
37. US 2013281814 A1,
38. US 2019133523 A1
39. U.S. Pat. No. 4,121,575 (A)
40. U.S. Pat. No. 4,593,698 B1
41. U.S. Pat. No. 6,400,975 B1
42. U.S. Pat. No. 6,115,623 A
43. WO 02/096287 A1

The invention claimed is:

1. A method for positioning of six ECG electrodes for precordial leads V1-V6 on a human subject based on the subject's body height, characterised in that the method comprises the steps of
(i) determining the horizontal level of the electrodes for leads V4, V5 and V6 (102, 703), wherein the horizontal level (102, 703) is deter-mined to be between (0.088× body height) [cm] and (0.092×body height) [cm] downwards from the sternal notch (701) along the ster-nal midline (101, 702);
(ii) marking the position of the electrode for lead V1 (104, 708) from 2.8 cm to 3 cm above the horizontal level (102, 703) along the sternal midline (101, 702), and from 2.9 cm to 3.5 cm to the subject's right from the sternal midline (101, 702);
(iii) marking the position of the electrode for lead V2 (105, 709) from 2.8 cm to 3 cm above the horizontal level (102, 703) along the sternal midline (101, 702), and from 2.9 cm to 3.5 cm to the subject's left of the sternal midline (101, 702);
(iv) marking the position for the electrode for lead V4 (107, 704) at the horizontal level (102, 703) and (body height/16)±1 [cm] to the subject's left from the sternal midline (101, 702) along the surface of the thorax;
(v) marking the position for the electrode for lead V3 (106) from (0.023×body height) [cm] to (0.025×body height) [cm] from the position of the electrode for lead V2 (105, 709) to the direction of the position for the electrode for lead V4 (107, 704) along the connecting line formed by the position of the electrode for lead V2 (105, 709) and the position of the electrode for lead V4 (107, 704);
(vi) marking the position for the electrode for lead V5 (705) at the hori-zontal level (102, 703) and ((3×body height)/32)+1 [cm] to the subject's left from the sternal midline (101, 702) along the surface of the thorax;
(vii) marking the position for the electrode for lead V6 (706) at the hori-zontal level (102, 703) and (body height/8)±1 [cm] to the subject's left from the sternal midline (101, 702) along the surface of the thor-ax; and
(viii) positioning the six ECG electrodes for precordial leads V1-V6 at the positions identified in steps (ii) to (vii);
wherein the method is carried out on the same subject on at least two different time points.

2. The method of claim 1, wherein the horizontal (102, 703) level is determined to be between (0.09×body height) [cm] and (0.091×body height) [cm] downwards from the sternal notch along the sternal midline (101, 702).

3. The method of claim 1, wherein
(a) the position of the electrode for lead V1 (104, 708) is from 2.9 cm to 3 cm above the horizontal level (102, 703) along the sternal midline (101, 702) or
(b) the position of the electrode for lead V2 (105, 709) is from 2.9 cm to 3 cm above the horizontal level (102, 703) along the sternal midline (101, 702); or
(c) the position of the electrode for lead V1 (104, 708) is from 2.9 cm to 3 cm above the horizontal level (102, 703) along the sternal midline (101, 702) and the position of the electrode for lead V2 (105, 709) is from 2.9 cm to 3 cm above the horizontal level (102, 703) along the sternal midline (101, 702).

4. The method of claim 1, wherein
(a) the position of the electrode for lead V1 (104, 708) is from 2.9 cm to 3.5 cm to the subject's right from the sternal midline (101, 702) or
(b) the position of the electrode for lead V2 (105, 709) is from 2.9 cm to 3.5 cm to the left from the sternal midline (101, 702); or
(c) the position of the electrode for lead V1 (104, 708) is from 2.9 cm to 3.5 cm to the subject's right from the sternal midline (101, 702), and the position of the electrode for lead V2 (105, 709) is from 2.9 cm to 3.5 cm to the left from the sternal midline (101, 702).

5. The method of claim 1, wherein the position for the electrode for lead V3 (106) is from (0.024×body height) [cm] to (0.025×body height) [cm], or from (0.023×body height) [cm] to (0.024×body height) [cm] from the position of the electrode for lead V2 (105, 709) to the direction of the position for the electrode for lead V4 (107, 704).

6. The method of claim 1, wherein
(a) the position for the electrode for lead V4 (107, 704) is at the horizontal level (102, 703) and (body height/16) ±0.8 [cm] to the subject's left from the sternal midline (101, 702) along the surface of the thorax; or
(b) the position for the electrode for lead V5 (705) is at the horizontal level (703, 102) and ((3×body height)/32)

±0.8 [cm] to the subject's left from the sternal midline (702, 101) along the surface of the thorax; or (c) the position for the electrode for lead V6 (706) is at the horizontal level (703, 101) and (body height/8)±0.8 [cm], preferably (body height/8)±0.6 [cm] to the subject's left from the sternal midline (702, 101) along the surface of the thorax.

7. The method of claim 1, wherein (a) the horizontal level (102, 703) is determined to be (0.09×body height) [cm] downwards from the sternal notch (701) along the ster-nal midline (101, 702);

(b) the position of the electrode for lead V1 (104, 708) is 3 cm above the horizontal level (102, 703) along the sternal midline (101, 702);

(c) the position of the electrode for lead V2 (105, 709) is 3 cm above the horizontal level (102, 703) along the sternal midline (101, 702);

(d) the position of the electrode for lead V1 (104, 708) is 3.0 cm to the subject's right from the sternal midline (101, 702);

(e) the position of the electrode for lead V2 (105, 709) is 3.0 cm to the subject's left from the sternal midline (101, 702);

(f) the position for the electrode for lead V4 (107, 704) is at the horizontal level (102, 703) and (body height/16) [cm] to the subject's left from the sternal midline (101, 702) along the surface of the thorax;

(g) the position for the electrode for lead V3 (106) is (0.024×body height) [cm] from the position of the electrode for lead V2 (105, 709) to the direction of the position for the electrode for lead V4 (107, 704);

(h) the position for the electrode for lead V5 (705) is at the horizontal level (102, 703) and ((3×body height)/32) [cm] to the subject's left from the sternal midline (101, 702) along the surface of the thorax; and (i) the position for the electrode for lead V6 (706) is at the horizontal level (102, 703) and (body height/8) [cm] to the subject's left from the sternal midline (101, 702) along the surface of the thorax.

8. The method of claim 1, wherein the human subject is an obese human subject.

9. A device suitable for use in a method as defined in claim 1, characterised in that the device is in the form of a rectangular sheet of a flexible material, having an upper short side (201) and a lower short side (202), and a first long side (203) and a second long side (204);

wherein each short side (201, 202) has a length of from 2.8 cm to 3.2 cm, and each long side (203, 204) has a length of at least 19 cm, and wherein the midline of the device (205) is marked on the upper short side (201) of the device;

wherein a long side of said device (203, 204) carries a mark indicating the distance between the position for the electrode for lead VI and the position for the electrode for lead V2 (210), starting from the corner (209) of the upper short side (201) and along the long side of said device (203, 204), further indicating the middle point (208) in between said corner (209) of the upper short side (201) and said mark indicating the position for the electrode of lead V2 (210); and wherein said device comprises along its longitudinal midline a slot (206) for marking the sternal midline and the position of the horizontal level of the electrodes for leads V4, V5 and V6, wherein said device carries marks indicating the distance, starting from the upper short side (201), between the sternal notch and the position of said horizontal level of the electrodes for leads V4, V5, and V6 for different body heights (207); and wherein said device carries marks indicating the distance, starting from a corner of the upper short side (201) and along a long side (203, 204), between the position of the electrode for lead V2 and the midpoint between the positions for the electrodes for the leads V2 and V4, thereby determining the position of the electrode for the lead V3 for different body heights (213); and wherein said device carries marks indicating the distance, starting from a corner of the upper short side (201) and along a long side (203, 204), from the sternal midline to the position of the electrode for the lead V4 on the horizontal level of the electrodes for leads V4, V5 and V6 for different body heights (211); and wherein said device carries marks indicating the distance, starting from a corner of the upper short side (201) and along a long side (203, 204), of either (i) the position of the electrode for the lead V4 and the position of the electrode for the lead V6 on the horizontal level of the electrodes for leads V4, V5 and V6 for different body heights (211) or (ii) the position of the electrode for the lead V6 on the horizontal level of the electrodes for leads V4, V5 and V6 for different body heights.

10. The device of claim 9, wherein (a) the length of each short side (201, 202) is equal to the distance be-tween the horizontal level of the electrodes for leads V1 and V2 (103, 711), and the horizontal level of the electrodes for leads V4, V5, and V6 (102, 703); or (b) the length of each long side (203, 204) is at least 19.5 cm; or (c) wherein the length of each short side (201, 202) is equal to the distance between the horizontal level of the electrodes for leads V1 and V2 (103, 711), and the horizontal level of the electrodes for leads V4, V5, and V6 (102, 703); and the length of each long side (203, 204) is at least 19.5 cm.

11. The device of claim 9, wherein the distance between said upper short side (201) and said marks indicating the horizontal level for the electrodes of the leads V4, V5, and V6 (207) is from (0.088×body height) [cm] to (0.092×body height) [cm], and said marks (207) indicate the body height corresponding to the such calculated distance.

12. The device of claim 9, wherein the distance between the corner of said upper short side (201) and said mark indicating the position for the electrode for lead V2 (210) on said long side (203, 204) is from 5.8 cm to 7.0 cm, wherein said corner of said upper short side carries a mark indicating the position of the electrode for the lead V1 (209).

13. The device of claim 9, wherein the distance between the corner of said upper short side (201) and said marks indicating the position for the electrode for lead V3 (213) is from (0.023×body height) [cm] to (0.025×body height) [cm], and said marks (213) indicate the body height corresponding to the such calculated distance.

14. The device of claim 9, wherein the distance between the corner of said upper short side (201) and said mark indicating the position for the electrode for lead V4 (211) is (body height/16)±1.0 [cm], and said marks (211) indicate the body height corresponding to the such calculated distance.

15. The device of claim 9, wherein the distance between the corner of said upper short side (201) and said mark indicating the position for the electrode for lead V5 (212) is ((3×body height)/32)±1.0 [cm], and said marks (212) indicate the body height corresponding to the such calculated distance.

16. The device of 9, wherein the distance between the corner of said upper short side (201) and said mark indicating the position for the electrode for lead V6 (211) is the dis-tance between position of the electrode for the lead V4 and the position of the electrode for the lead V6 on the horizontal level of the electrodes for leads V4, V5 and V6, and the marks (211) indicating the position for the electrode for lead V6 for different body heights are identical to the marks indicating the position for the electrode for the lead V4 (211); or the distance between the corner of said upper short side (201) and said mark indicating the position for the electrode for lead V6 is the distance between the sternal midline to the position of the electrode for the lead V6 on the horizontal level of the electrodes for leads V4, V5 and V6, and said distance is (body height/8)±1.0 [cm], and said marks indicate the body height corresponding to the such calculated distance.

17. The device of claim 9, wherein
(a) the length of each short side (201, 202) is 3.0 cm; and
(b) the length of each long side (203, 204) 21.0 cm; and
(c) the distance between said upper short side (201) and said marks indicating the horizontal level for the electrodes of the leads V4, V5, and V6 (207) is (0.09×body height) [cm], rounded to the nearest 0.5 cm, and said marks (207) indicate the body height corresponding to the such calculated distance; and
(d) the distance between the corner of said upper short side (201) and said mark indicating the position for the electrode for lead V2 (210) on said long side (204) is 6 cm, wherein said long side is the second long side (204), and wherein said corner of said upper short side carries a mark indicating the position of the electrode for the lead V1 (209); and
(e) the distance between the corner of said upper short side (201) and said marks indicating the position for the electrode for lead V3 (213) is (0.024×body height) [cm], rounded to the nearest 0.5 cm, where-in said marks (213) are positioned along the first long side (203) and said marks (213) indicate the body height corresponding to the such calculated distance; and
(f) the distance between the corner of said upper short side (201) and said mark indicating the position for the electrode for lead V4 (211) is (body height/16) [cm], rounded to the nearest 0.5 cm, wherein said marks are positioned along the first long side (203) and said marks (211) indicate the body height corresponding to the such cal-culated distance; and
(g) the distance between the corner of said upper short side (201) and said mark indicating the position for the electrode for lead V5 (212) is ((3×body height)/32) [cm], rounded to the nearest 0.5 cm, where-in said marks (212) are positioned along the first long side (203) and said marks (212) indicate the body height corresponding to the such calculated distance; and
(h) the distance between the corner of said upper short side (201) and said marks indicating the position for the electrode for lead V6 (211) is the distance between position of the electrode for the lead V4 and the position of the electrode for the lead V6 on the horizontal level of the electrodes for leads V4, V5 and V6, and the marks indicating the position for the electrode for lead V6 for different body heights (211) are iden-tical to the marks indicating the position for the electrode for the lead V4 (211).

18. The device of claim 9, wherein said said longitudinal slot (206) has a width of from 0.1 cm to 1.0 cm, preferably from 0.2 cm to 0.8 cm, more preferably from 0.4 cm to 0.6 cm, and most preferably a width of 0.5 cm, and/or a length of about 10 cm, and/or wherein said longitudinal slot (206) begins from about 8 cm to about 10 cm from the upper short side (201), preferably about 9 cm from the upper short side (201).

19. The device of claim 9, wherein the device has a transverse handle (214) below said longitudinal slot (206) of the device, or at least one longitudinal handle (215, 216) above said longitudinal slot (206) of the device.

20. A method of marking positions for or for positioning of six ECG electrodes for precordial leads V1-V6 on a human subject or a model of a human subject, characterised in comprising the steps of
(a) aligning the mark of the midline (205) of the upper short end (201) of a device according to claim 9 (302) with the midpoint of the sternal notch (301), such that the longitudinal slot of said device (206) is at the midline of the subject's sternum (303), and marking (305) the midline of the subject's sternum (303) through the longitudinal slot of said device (206), and marking (305) the horizontal level of the electrodes for the leads V4, V5 and V6 (306) in accordance with the marks on the device (207) and the subject's body height;
(b) aligning the upper short side (402, 201) to the sternum's midline (405) marked in step (a) (406, 305), and aligning the long side carrying the marks for the position of the electrodes for the leads V4 (406, 507), V5 (408) and V6 (406, 507) to the horizontal level (403, 503) marked in step (a) (406, 305, 505), and marking the position for the individual positions for the electrodes for the lead V4 (407), V5 (409), and V6 (508) in accordance with the marks on the device (406, 408, 507) and the subject's body height;
(c) aligning the device (600) such that the middle point between the marks for the position of the electrode for lead V1 and V2 (208, 602) is positioned 2.8 cm to 3.0 cm, above the horizontal level for the electrodes for the leads V4, V5, and V6 (605), and on the sternum midline (604) marked in step (a) (603, 305), and marking the position for the elec-trodes for the leads V1 (609) and V2 (610) in accordance with the marks on the device (209, 210); and
(d) aligning the corner formed by the upper short side (201) and the longer side carrying the marks for the position of the electrode for lead V3 (213) with the marked position for the electrode for the lead V2 (806), and simultaneously aligning the long side carrying the marks for the position of the electrode for lead V3 (213) with the marked position for the electrode for the lead V4 (807), and marking the position of the electrode for the lead V3 (808) in accordance with the marks on the device (213) and the subject's body height; and
(e) positioning the six ECG electrodes for precordial leads V1-V6 at the positions identified in steps (b) to (d).

* * * * *